United States Patent
Howard et al.

(10) Patent No.: US 9,648,091 B2
(45) Date of Patent: May 9, 2017

(54) TRANSFORMING SENSORY REPRESENTATIONS

(71) Applicant: The Boeing Company, Chicago, IL (US)

(72) Inventors: Emily Louise Howard, San Pedro, CA (US); Brian Dale Laughlin, Wichita, KS (US); Wayne Richard Howe, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 112 days.

(21) Appl. No.: 14/334,939

(22) Filed: Jul. 18, 2014

(65) Prior Publication Data

US 2016/0019674 A1    Jan. 21, 2016

(51) Int. Cl.
| | | |
|---|---|---|
| G09G 5/00 | (2006.01) | |
| H04L 29/08 | (2006.01) | |
| G06Q 10/00 | (2012.01) | |
| G06T 11/20 | (2006.01) | |
| G06F 3/0481 | (2013.01) | |

(Continued)

(52) U.S. Cl.
CPC .............. H04L 67/10 (2013.01); G06Q 10/00 (2013.01); G06T 11/206 (2013.01); G06F 3/0481 (2013.01); G06F 9/4443 (2013.01); G06T 11/00 (2013.01); G06T 11/60 (2013.01); G06T 19/00 (2013.01)

(58) Field of Classification Search
CPC ......... G06T 11/60; G06T 19/00; G06T 11/00; G06F 9/4443; G06F 3/0481
See application file for complete search history.

(56) References Cited

U.S. PATENT DOCUMENTS 7,841,987 B2 *  11/2010  Sotos ..................... A61B 5/04
                                                 600/529
8,712,958 B2 *  4/2014  Choi .................... G11B 27/034
                                                 707/612

(Continued)

OTHER PUBLICATIONS

Freudenrich et al., "How Your Brain Works: Hard-Wired," HowStuffWorks.com, A Discovery Company, Jun. 2001, 1 page, accessed Jul. 18, 2014. http://science.howstuffworks.com/life/inside-the-mind/human-brain/brain8.htm.

(Continued)

Primary Examiner — Abderrahim Merouan
(74) Attorney, Agent, or Firm — Yee & Associates, P.C.

(57) ABSTRACT

A computer-implemented method and apparatus for modifying an entity sensory representation. An entity sensory representation representing an entity is received. The entity sensory representation comprises a plurality of sensory representations that represent a plurality of items that are part of the entity. Each of the plurality of items is associated with a set of values for a set of measurable factors of interest. A set of scale factors is calculated for each of the plurality of sensory representations based on the set of values associated with the each of the plurality of items. The plurality of sensory representations is modified using the set of scale factors to form a plurality of modified sensory representations that establish a relative relationship between the plurality of items represented by the plurality of modified sensory representations with respect to the set of measurable factors of interest.

20 Claims, 20 Drawing Sheets

(51) Int. Cl.
G06T 11/60 (2006.01)
G06F 9/44 (2006.01)
G06T 11/00 (2006.01)
G06T 19/00 (2011.01)

(56) References Cited

U.S. PATENT DOCUMENTS

| | | | | |
|---|---|---|---|---|
| 2003/0167289 | A1* | 9/2003 | Rhodes | G06E 3/00 |
| | | | | 708/200 |
| 2005/0254727 | A1* | 11/2005 | Fedorovskaya | G06T 7/0002 |
| | | | | 382/286 |
| 2009/0190857 | A1* | 7/2009 | Epshtein | G06T 17/05 |
| | | | | 382/276 |
| 2009/0278861 | A1* | 11/2009 | Price | G06Q 30/02 |
| | | | | 345/668 |
| 2015/0326274 | A1* | 11/2015 | Flood | H04B 1/7143 |
| | | | | 375/132 |

OTHER PUBLICATIONS

Costandi, "Wilder Penfield, Neural Cartographer," neurophilosophy.wordpress.com, Aug. 2008, 30 pages, accessed Jul. 18, 2014. http://neurophilosophy.wordpress.com/2008/08/27/wilder_penfield_neural_cartographer/.

Hampden-Turner, "Maps of the Mind: Charts and Concepts of the Mind and Its Labyrinths; The Physiology of Brain Functioning, Map 18—The Motor-Sensory Homunculus: The research of Wilder Penfield," Collier Books, Macmillan Publishing Company, copyright 1981, pp. 74-75. http://bridgeacrossconsciousness.net/mindmaps/Map18.pdf.

* cited by examiner

| AIRCRAFT SECTION | ENERGY USAGE | SCALE FACTOR |
|---|---|---|
| COCKPIT | HIGH | 2 |
| FUSELAGE | LOW | 1 |
| LEFT WING | LOW | 1 |
| RIGHT WING | LOW | 1 |
| LEFT AILERON | LOW | 1 |
| RIGHT AILERON | LOW | 1 |
| LEFT ENGINE | VERY HIGH | 3 |
| RIGHT ENGINE | VERY HIGH | 3 |
| TAIL | LOW | 1 |
| RUDDER | LOW | 1 |

FIG. 5

| ALERT | THREAT LEVEL | SCALE FACTOR |
|---|---|---|
| ALERT #1 - ROOM 1 | SERIOUS | 2 |
| ALERT #2 - ROOM 2 | MODERATE | 1 |
| ALERT #3 - ROOM 3 | VERY MINOR | 0.5 |
| ALERT #4 - ROOM 4 | MODERATE | 1 |
| ALERT #5 - ROOM 5 | MINOR | 0.75 |
| ALERT #6 - ROOM 6 | MODERATE | 1 |
| ALERT #7 - ROOM 7 | MODERATE | 1 |
| ALERT #8 - ROOM 8 | SERIOUS | 2 |
| ALERT #9 - ROOM 9 | MODERATE | 1 |

TRANSFORMING SENSORY REPRESENTATIONS

BACKGROUND INFORMATION

1. Field

The present disclosure relates generally to representing entities in a manner recognizable by the human senses. More particularly, the present disclosure relates to a method and apparatus for modifying an entity sensory representation to establish a relative relationship between the items in an entity represented by the entity sensory representation with respect to one or more factors of interest.

2. Background

In some situations, understanding or analyzing an entity that is made up of multiple items may require understanding or analyzing a relative relationship between the items with respect to some category of interest. For example, understanding how the different regions of the human body are seen from the perspective of the brain may require understanding how richly innervated the different regions are by the brain.

The term "homunculus" is generally used to mean any representation of a small or miniature human being. For example, the homunculus may take the form of a three-dimensional physical model, a two-dimensional image, a three-dimensional computer-aided design model, or some other type of representation. A cortical homunculus is a modified version of a typical homunculus. With a cortical homunculus, the sizes of the different anatomical regions of the human body are in proportion to the amount of brain tissue associated with the anatomical regions in the sensorimotor cortex. This type of visual representation of the human body provides an understanding of how the various anatomical regions are weighted in terms of their relative significance in the human brain.

In some situations, it may be desirable to apply this concept of providing a visual representation of the relative relationship of the different anatomical regions of the human body with respect to the amount of sensorimotor cortical tissue designated for the different anatomical regions to other disciplines. Therefore, it would be desirable to have a method and apparatus that take into account the natural sensory processing and understanding capabilities of humans, as well as other possible aspects, and apply these capabilities to other disciplines.

SUMMARY

In one illustrative embodiment, an apparatus comprises a transformer. The transformer receives an entity sensory representation that represents an entity. The entity sensory representation comprises a plurality of sensory representations that represent a plurality of items that are part of the entity. Each of the plurality of items is associated with a set of values for a set of measurable factors of interest. The transformer calculates a set of scale factors for each of the plurality of sensory representations based on the set of values associated with the each of the plurality of items. The transformer modifies the plurality of sensory representations using the set of scale factors to form a plurality of modified sensory representations that establish a relative relationship between the plurality of items represented by the plurality of modified sensory representations with respect to the set of measurable factors of interest.

In another illustrative embodiment, a computer-implemented method for modifying an entity sensory representation that represents an entity is provided. The entity sensory representation that represents the entity is received. The entity sensory representation comprises a plurality of sensory representations that represent a plurality of items that are part of the entity. Each of the plurality of items is associated with a set of values for a set of measurable factors of interest. A set of scale factors is calculated for each of the plurality of sensory representations based on the set of values associated with the each of the plurality of items. The plurality of sensory representations is modified using the set of scale factors to form a plurality of modified sensory representations that establish a relative relationship between the plurality of items represented by the plurality of modified sensory representations with respect to the set of measurable factors of interest.

In yet another illustrative embodiment, a computer-implemented method for automating the transformation of an entity image into a transformed entity image is provided. The entity image representing an entity is received. The entity image comprises a plurality of image portions that represent a plurality of items that are part of the entity. A set of values for a set of measurable factors of interest is identified for each of the plurality of items. A set of scale factors is calculated for the each of the plurality of image portions based on the set of values associated with the each of the plurality of items. The plurality of image portions is modified using the set of scale factors identified for the each of the plurality of image portions to form a plurality of modified image portions. A position of the plurality of modified image portions is adjusted relative to each other with respect to a total display area to form the transformed entity image. The transformed entity image visually establishes a relative relationship between the plurality of items represented by the plurality of modified image portions with respect to the set of measurable factors of interest.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a table indicating the energy usage of the different aircraft sections of an aircraft in accordance with an illustrative embodiment;

DETAILED DESCRIPTION

Figure 1:
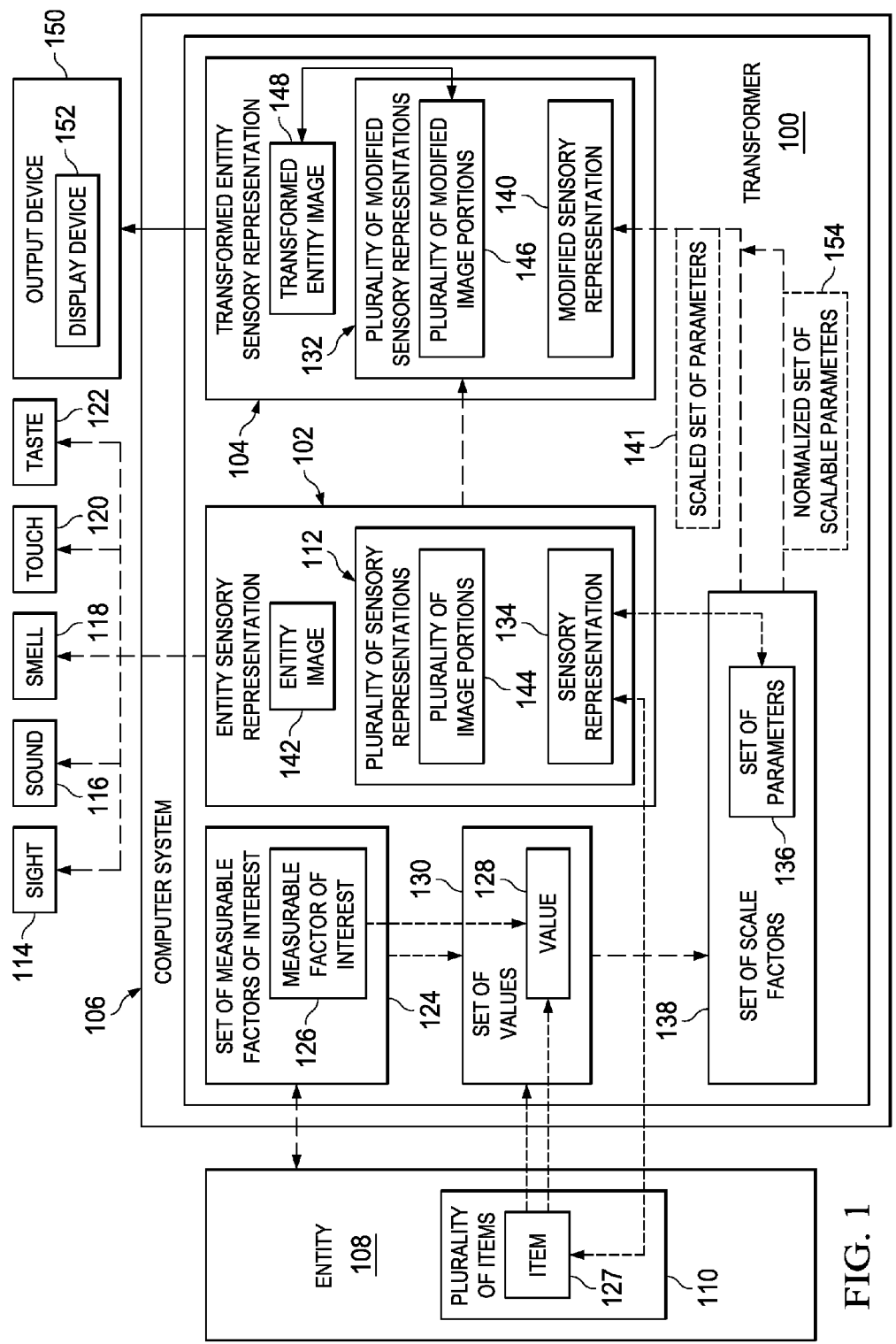
FIG. 1 is an illustration of a transformer in the form of a block diagram in accordance with an illustrative embodiment.

The illustrative embodiments recognize and take into account different considerations. For example, the illustrative embodiments recognize and take into account that it may be desirable to apply the concept of visually representing the relative relationship between the different anatomical regions of the human body with respect to their relative significance in the brain to other disciplines. In particular, the general concept of creating a visual representation that provides the relative significance between a plurality of items with respect to some factor of interest may be applied to the aerospace industry, corporate management, emergency alert systems, training programs, and any other number of disciplines or applications.

The illustrative embodiments also recognize and take into account that it may be desirable to transform a visual representation of an entity based on more than one factor of interest. Further, the illustrative embodiments recognize and take into account that it may be desirable to transform a sensory representation corresponding to some other sense other than the sense of sight. For example, transforming an audio recording such that the decibel levels of different sections of the audio recording are adjusted to reflect the relative importance between the different sections of the audio recordings may be desirable.

Additionally, the illustrative embodiments recognize and take into account that using a computer system to automate the process by which a sensory representation is transformed may reduce the time, expense, and labor associated with the transformation. For example, it may be desirable to automate the transformation process such that a same visual representation may be transformed multiple times to form multiple transformed visual representations corresponding to different factors of interest. Automating this type of process may significantly reduce the time, expense, and labor needed to create these transformed visual representations as compared to hand-drawing each of the transformed visual representations or manually calculating the needed modifications for each transformation of the visual representation.

Thus, the illustrative embodiments provide a method and apparatus for modifying an entity sensory representation that represents an entity using at least one of the five human senses. In particular, the entity sensory representation may be comprised of a plurality of sensory representations that represent a plurality of items that make up the entity. The entity sensory representation may be modified to create a transformed sensory representation that establishes a relative relationship between the plurality of items represented by the entity sensory representation with respect to a set of measurable factors of interest.

For example, the transformed entity sensory representation may establish the relative significance of the plurality of items in a manner that can be easily understood. When the transformed entity sensory representation is a transformed entity image, the transformed entity image may provide, at a glance, the relative significance of the plurality of items in a manner that can be easily recognized. In some cases, the transformed entity image may be referred to as providing a "snapshot understanding" of the relative significance of the plurality of items. When the transformed entity sensory representation is some other form of sensory output, the human may receive the sensory output as a simple perceptual input that provides a quick, and in some cases, near-instantaneous understanding of the relative significance of the plurality of items.

Referring now to the figures and, in particular, with reference to FIG. 1, an illustration of a transformer is depicted in the form of a block diagram in accordance with an illustrative embodiment. In this illustrative example, transformer 100 may be implemented using software, hardware, firmware, or a combination thereof.

When software is used, the operations performed by transformer 100 may be implemented using, for example, without limitation, program code configured to run on a processor unit. When firmware is used, the operations performed by transformer 100 may be implemented using, for example, without limitation, program code and data and stored in persistent memory to run on a processor unit.

When hardware is employed, the hardware may include one or more circuits that operate to perform the operations performed by transformer 100. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and processes performed by transformer 100 may be performed using organic components integrated with inorganic components. In some cases, the operations and processes may be performed by entirely organic components, excluding a human being. As one illustrative example, circuits in organic semiconductors may be used to perform these operations and processes.

As depicted in FIG. 1, transformer 100 may be implemented using computer system 106 in one illustrative example. Computer system 106 may include one or more computers that are in communication with each other.

Transformer 100 may transform entity sensory representation 102 into transformed entity sensory representation 104. As used herein, a "sensory representation" is a representation that can be understood by a person using at least one of the five human senses. These five senses include the sense of sight 114, the sense of sound 116, the sense of smell 118, the sense of touch 120, and the sense of taste 122.

A sensory representation corresponding to the sense of sight 114 may be referred to as a visual representation. A visual representation may take the form of, for example, without limitation, an image, a three-dimensional physical model, alphanumeric text, an icon, or other type of visual representation.

A sensory representation corresponding to the sense of sound 116 may be referred to as an audible representation. An audible representation may take the form of, for example, without limitation, an audio recording, a sound, music, or some other type of audible representation.

Further, a sensory representation corresponding to the sense of smell 118 may be referred to as an olfactory representation. A sensory representation corresponding to the sense of touch 120 may be referred to as a tactile representation. The tactile representation may take the form of, for example, without limitation, a texture, a temperature, or some other type of representation that may be perceived through touch. A sensory representation corresponding to the sense of taste 122 may be referred to as a gustatory representation.

Entity sensory representation 102 represents entity 108. As used herein, entity sensory representation may "represent" entity 108 by symbolizing, presenting a meaning for, presenting an understanding of, standing in for, being an equivalent of, serving as an example of, or providing some other type of indication of entity 108.

Entity 108 is the whole formed by plurality of items 110. Entity 108 may take a number of different forms. For example, entity 108 may take the form of a body, a group, a collection, or some other type of "whole" that is comprised of plurality of items 110. As used herein, an "item" may take the form of a part, a portion of an object or structure, a person, a group of people, a time interval, an alert, a security level, a building, a floor of a building, a section of a shop floor area, a title, an employee number, a social security number, a phone number, an aircraft component, an electronic component, a hardware component, a software component, or some other type of item.

As depicted, entity sensory representation 102 comprises plurality of sensory representations 112 that represent plurality of items 110. In these illustrative examples, plurality of sensory representations 112 may be individual sensory representations that are collectively referred to as entity sensory representation 102. In other illustrative examples, plurality of sensory representations 112 may be portions of a single entity sensory representation 102. Examples of different types of entities and entity sensory representations corresponding to these entities are described in FIG. 2 below.

Set of measurable factors of interest 124 may be used to evaluate or analyze plurality of items 110. As used herein, a "set of" items may include one or more items. For example, set of measurable factors of interest 124 may include one or more measurable factors of interest.

Measurable factor of interest 126 is an example of one of set of measurable factors of interest 124. Measurable factor of interest 126 may be an attribute, parameter, characteristic, or other type of factor that can be measured quantitatively, qualitatively, or both. For example, measurable factor of interest 126 may be, but is not limited to, a level of importance, a salary amount, a level of activity, energy usage, surface area, intensity, amplitude, phase, price, a physical dimension such as width, length, or height, or some other type of factor that can be measured as having a value with some range of values.

Item 127 may be an example of one of plurality of items 110. With respect to measurable factor of interest 126, item 127 may have value 128. Value 128 may be a nominal value, a numeric value, a range of values, a level, a category, a color, a physical quantity, a measure of amount, or some other type of qualitative or quantitative measurement. In other illustrative examples, value 128 may be an audible tone, an audible frequency, an odor, an odor intensity, a texture, a roughness of texture, a taste, or a quality of taste such as saltiness or sweetness.

For example, measurable factor of interest 126 may be length and item 127 may be a structure having a value for the length of about 10 inches. In another example, measurable factor of interest 126 may be a salary amount and item 127 may be an employee having a value for the salary amount of about $100,000. In yet another example, measurable factor of interest 126 may be energy usage and item 127 may be an aircraft engine having a value for energy usage equal to one of a very low level, a low level, a normal level, a high level, or a very high level.

Each of plurality of items 110 may be associated with a set of values, similar to value 128 described above, for set of measurable factors of interest 124. For example, item 127 may be associated with set of values 130 for set of measurable factors of interest 124. In these illustrative examples, transformer 100 may receive input that includes set of values 130 for set of measurable factors of interest 124 for each of plurality of items 110. In other illustrative examples, transformer 100 may be configured to identify set of values 130 for set of measurable factors of interest 124 for each of plurality of items 110 based on input data received by transformer 100.

Transformer 100 is configured to modify plurality of sensory representations 112 in a manner that establishes a relative relationship between plurality of items 110 represented by plurality of sensory representations 112 with respect to set of measurable factors of interest 124. In particular, transformer 100 may calculate a set of scale factors for each of plurality of sensory representations 112 based on the set of values associated with each of plurality of items 110. The set of scale factors may be used to adjust a set of parameters for each of plurality of sensory representations 112 to form plurality of modified sensory representations 132. Plurality of modified sensory representations 132 together form transformed entity sensory representation 104.

In this manner, entity sensory representation 102 may be homuncularly transformed using the different sets of scale factors for each of plurality of sensory representations 112 to form transformed entity sensory representation 104. In other words, entity sensory representation 102 may be transformed in a manner similar to the manner in which a cortical homunculus is formed. Transformed entity sensory representation 104 may be referred to as a homuncularized entity sensory representation.

For example, sensory representation 134 may be one of plurality of sensory representations 112 and may represent item 127. Sensory representation 134 may be associated with set of parameters 136. A parameter in set of parameters 136 may take a number of different forms. For example, the parameter may be a width, a height, a center point, a center point distance, a transparency value, a contrast value, a decibel level, a speed, a pitch, a bandwidth, a start time, an end time, a total time, a texture, a thickness, a spiciness level, a sweetness level, or some other type of parameter.

Each of set of parameters 136 may be scalable. In particular, each of set of parameters 136 may be scalable using a linear scale factor, a nonlinear scale factor, or both. The nonlinear scale factor may be, for example, without limitation, an exponential factor, a logarithmic scale factor, or some other type of nonlinear scale factor. In this manner, set of parameters 136 may be referred to as a set of scalable parameters.

Transformer 100 calculates set of scale factors 138 for sensory representation 134 based on set of values 130 for set of measureable factors of interest 124 for item 127 represented by sensory representation 134. Transformer 100 uses set of scale factors 138 to adjust set of parameters 136 for sensory representation 134 to form modified sensory representation 140. Depending on set of scale factors 138, modified sensory representation 140 may be the same or different from sensory representation 134.

In one illustrative example, set of scale factors 138 may have a one-to-one correspondence with set of parameters 136. For example, transformer 100 may linearly scale each parameter in set of parameters 136 by a corresponding scale factor in set of scale factors 138. In other illustrative examples, set of scale factors 138 may include a single scale factor that is used to linearly scale each of set of parameters 136.

Transformer 100 adjusts set of parameters 136 using set of scale factors 138 to form scaled set of parameters 141. Transformer 100 may then use scaled set of parameters 141 to create modified sensory representation 140.

In one illustrative example, entity sensory representation 102 may take the form of entity image 142. Entity image 142 may take the form of, for example, without limitation, an aircraft image, a spacecraft image, a watercraft image, an engine system image, or an image of some other type of entity. In some illustrative examples, entity image 142 may be a combined image formed by multiple images or a single image divisible into image portions. Entity image 142 may represent entity 108.

When entity sensory representation 102 takes the form of entity image 142, plurality of sensory representations 112 may take the form of plurality of image portions 144. Each of plurality of image portions 144 may take the form of a portion of entity image 142 or an individual image used to form entity image 142. Further, each of plurality of image portions 144 may represent a corresponding item in plurality of items 110.

Set of parameters 136 for each image portion in plurality of image portions 144 may take the form of, for example, a set of dimensions for each image portion. For example, the set of dimensions for an image portion may include a width and a height for the image portion.

Transformer 100 calculates a set of scale factors for each image portion in plurality of image portions 144 based on the set of values for set of measurable factors of interest 124 associated with the corresponding item in plurality of items 110 represented by each image portion. Transformer 100 then uses these sets of scale factors to adjust the set of parameters for each of plurality of image portions 144 to form scaled sets of parameters. These scaled sets of parameters may then be used to create plurality of modified image portions 146, which may be an example of plurality of modified sensory representations 132.

Plurality of modified image portions 146 may form transformed entity image 148. Transformed entity image 148 with plurality of modified image portions 146 may visually establish the relative relationship between plurality of items 110 represented by plurality of modified image portions 146 with respect to set of measurable factors of interest 124. Transformed entity image 148 with plurality of modified image portions 146 may provide a "snapshot understanding," or an understanding at a glance, of the relative relationship between plurality of items 110 with respect to set of measurable factors of interest 124.

In these illustrative examples, transformer 100 may send transformed entity sensory representation 104 to output device 150. Output device 150 may output transformed entity sensory representation 104 in a manner that can be understood using at least one of the five human senses.

For example, when transformed entity sensory representation 104 is a transformed visual representation, output device 150 may take the form of display device 152. Display device 152 may visually present a display of the transformed visual representation. In particular, when transformed entity sensory representation 104 takes the form of transformed entity image 148, display device 152 may be used to visually present a display of transformed entity image 148. Display device 152 may take the form of a monitor, a screen, a liquid crystal display device, a plasma display device, a touch screen device, a projection system, or some other type of display device.

Thus, transformer 100 allows entity sensory representation 102 of entity 108 to be transformed in a manner that reflects a relative measure of set of measurable factors of interest 124 for plurality of items 110 that make up entity 108. This type of transformed entity sensory representation 104 may provide a user with a way to quickly and easily understand the relative relationship between plurality of items 110 with respect to set of measurable factors of interest 124 without needing to rely on the sets of values identified for plurality of items 110.

This type of understanding may be preferable for a user that does not have the training to understand or process the sets of values for the plurality of items. For example, a user may need to understand a relative significance of each of plurality of items 110 with respect to some measurable factor of interest for performing a type of operation. However, the user may not have the training, knowledge, or skill to understand, interpret, or process the data to identify the value for the measurable factor of interest for each of plurality of items 110. Transformed entity sensory representation 104 may provide the user with the relative significance of each of plurality of items 110 without the user needing to understand, interpret, or process the data.

Further, implementing this type of evaluation or analysis within a computer system, such as computer system 106, allows the process to be automated. For example, a new transformed entity sensory representation may be quickly and easily created by transformer 100 when transformer 100 receives new input that includes a new set of values for set of measurable factors of interest 124 for at least one of plurality of items 110.

Further, transformer 100 may be capable of quickly and easily creating a new transformed entity sensory representation for different sets of measurable factors of interest. In this manner, entity sensory representation 102 may be transformed from a baseline for entity sensory representation in any number of ways and any number of times. This baseline may be the initial or original values for the set of parameters for each of plurality of sensory representations that make up entity sensory representation 102.

Depending on the implementation, the sets of values for set of measurable factors of interest 124 for plurality of items 110 may be static or dynamic. When the sets of values are dynamic, transformer 100 may, in some cases, be configured to update the sets of scale factors calculated for plurality of sensory representations 112 in correspondence with changes to the sets of values. Further, transformer 100 may update transformed entity sensory representation 104 in correspondence with the updates to the sets of scale factors. In this manner, the changing relative relationship between plurality of items 110 may be reflected in substantially real-time or near real-time.

As one illustrative example, transformer 100 may acquire the sets of values for plurality of items 110 in sensor data generated by one or more sensor systems configured to monitor set of measurable factors of interest 124 for plurality of items 110. The sets of values may be dynamic in that the sensor data may be received continuously over time. Transformer 100 may adjust the sets of scale factors for plurality of sensory representations 112 to update plurality of modified sensory representations 132 as the sets of values change. Computer system 106 may allow these adjustments and updates to be performed in substantially real-time.

Figure 2:
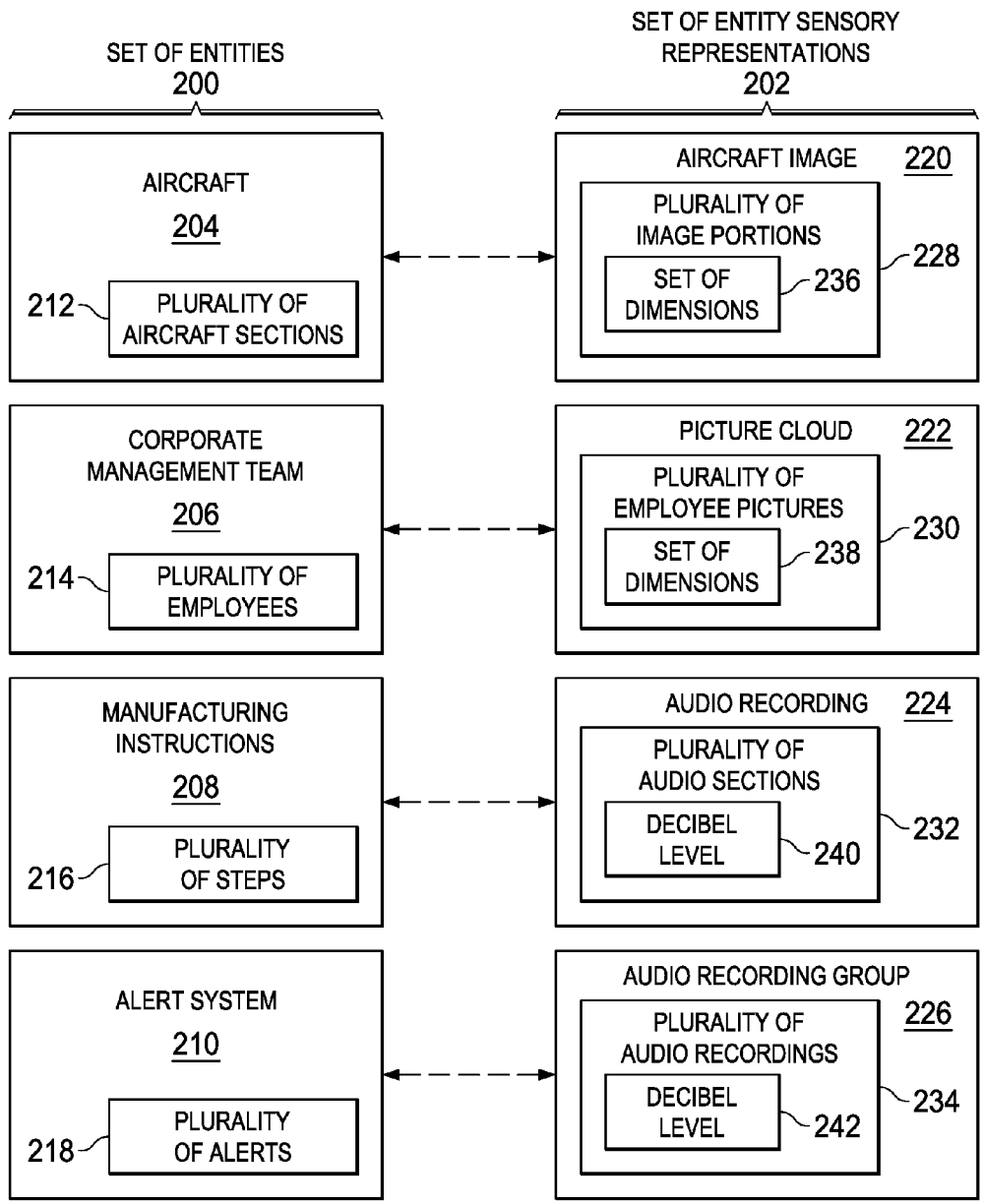
FIG. 2 is an illustration of a set of entities and a set of entity sensory representations in the form of a block diagram in accordance with an illustrative embodiment.

With reference now to FIG. 2, an illustration of a set of entities and a set of entity sensory representations is depicted in the form of a block diagram in accordance with an illustrative embodiment. Set of entities 200 and set of entity sensory representations 202 are depicted.

Set of entities 200 includes aircraft 204, corporate management team 206, manufacturing instructions 208, and alert system 210. Each of aircraft 204, corporate management team 206, manufacturing instructions 208, and alert system 210 is an example of one implementation for entity 108 in FIG. 1.

Aircraft 204 is comprised of plurality of aircraft sections 212. Corporate management team 206 is comprised of plurality of employees 214. Manufacturing instructions 208 is comprised of plurality of steps 216. Alert system 210 is comprised of plurality of alerts 218. Each of plurality of aircraft sections 212, plurality of employees 214, plurality of steps 216, and plurality of alerts 218 is an example of one implementation for plurality of items 110 in FIG. 1.

As depicted, set of entity sensory representations 202 includes aircraft image 220, picture cloud 222, audio recording 224, and audio recording group 226. Each of aircraft image 220, picture cloud 222, audio recording 224, and audio recording group 226 may be an example of one implementation for entity sensory representation 102 in FIG. 1. Aircraft image 220, picture cloud 222, audio recording 224, and audio recording group 226 are sensory representations of aircraft 204, corporate management team 206, manufacturing instructions 208, and alert system 210, respectively.

In this illustrative example, aircraft image 220 may be comprised of plurality of image portions 228. Picture cloud 222 may be comprised of plurality of employee pictures 230. Further, audio recording 224 may be comprised of plurality of audio sections 232. Audio recording group 226 may be comprised of plurality of audio recordings 234.

Each of plurality of image portions 228, plurality of employee pictures 230, plurality of audio sections 232, and plurality of audio recordings 234 may be an example of one implementation for plurality of sensory representations 112 in FIG. 1. Further, plurality of image portions 228, plurality of employee pictures 230, plurality of audio sections 232, and plurality of audio recordings 234 represent plurality of aircraft sections 212, plurality of employees 214, plurality of steps 216, and plurality of alerts 218, respectively.

In this illustrative example, the set of parameters that are scalable for each of plurality of image portions 228 may be set of dimensions 236. In one illustrative example, set of dimensions 236 includes a width and a height of an image portion. The set of parameters that are scalable for each of plurality of employee pictures 230 may be set of dimensions 238.

As depicted, each of plurality of audio sections 232 may have a single scalable parameter, which is decibel level 240. Similarly, each of plurality of audio recordings 234 may have a single scalable parameter, which is decibel level 242.

Although only sensory representations corresponding to the sense of sight and sound are depicted in set of entity sensory representations 202, set of entity sensory representations 202 may include other types of sensory representations in other illustrative examples. For example, other entity sensory representations may be tactile, olfactory, or gustatory. In yet other illustrative examples, an entity sensory representation may correspond to more than one human sense.

The illustrations of transformer 100 in FIG. 1 and set of entities 200 and set of entity sensory representations 202 in FIG. 2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some cases, transformer 100 may normalize the set of parameters for each of plurality of sensory representations 112 prior to adjusting these parameters. For example, set of parameters 136 may be normalized to form normalized set of parameters 154. Normalized set of parameters 154 may then be adjusted using set of scale factors 138 to form scaled set of parameters 141.

In other illustrative examples, set of entities 200 may include other types of entities. For example, set of entities 200 may include a spacecraft, a building, a corporate infrastructure, a financial portfolio, a safety manual, or some other type of entity.

Figure 3:
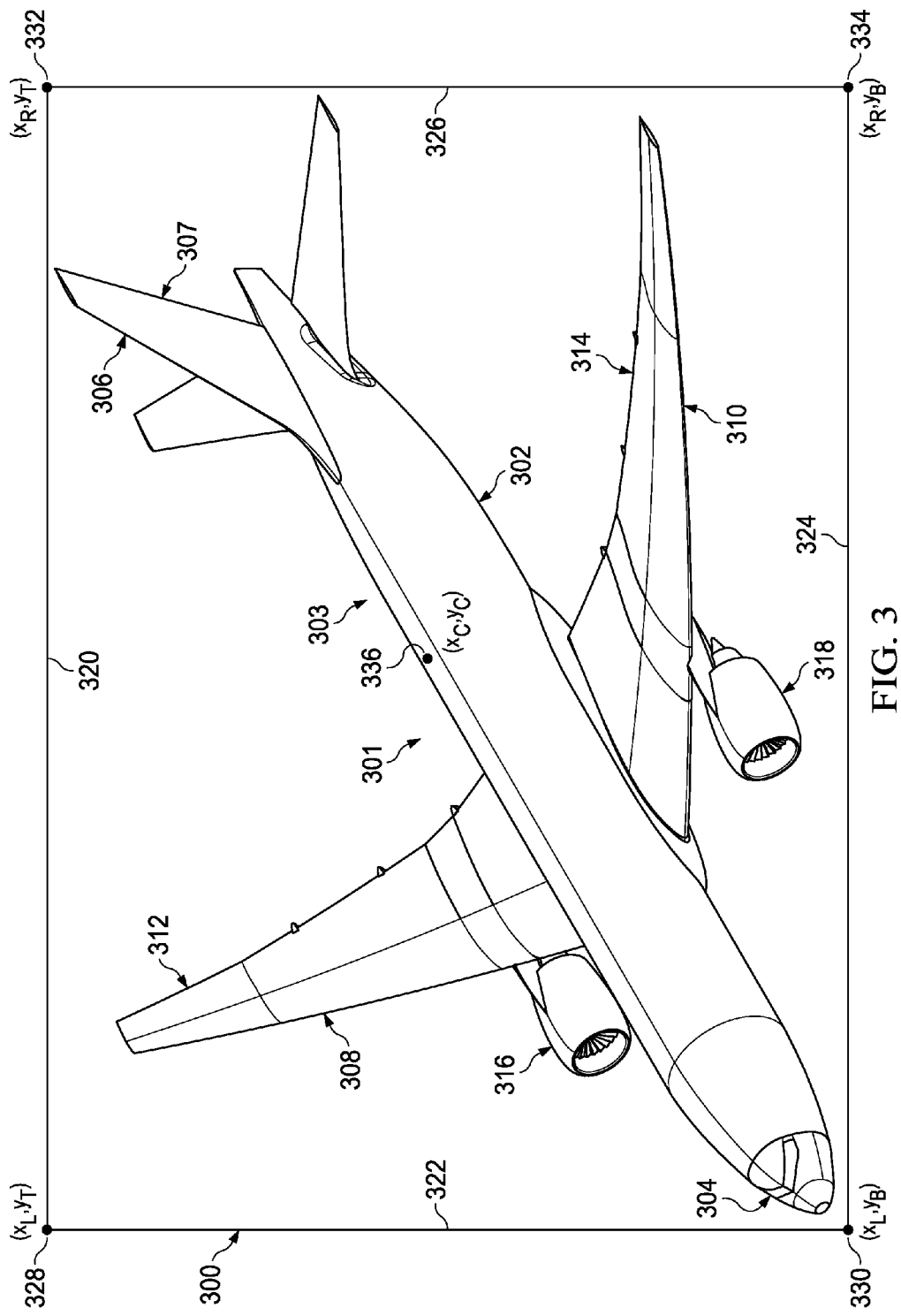
FIG. 3 is an illustration of a display of an aircraft image that visually represents an aircraft in accordance with an illustrative embodiment.

With reference now to FIG. 3, an illustration of a display of an aircraft image that visually represents an aircraft is depicted in accordance with an illustrative embodiment. In this illustrative example, display 300 of aircraft image 301 may be visually presented by a display device such as, for example, without limitation, display device 152 in FIG. 1. In particular, aircraft image 301 is an example of one implementation for transformed entity image 148.

Aircraft image 301 in display 300 is a visual representation of an aircraft. The aircraft is an example of an entity, such as entity 108 in FIG. 1.

As depicted, aircraft image 301 may be comprised of plurality of image portions 303. Plurality of image portions 303 includes fuselage portion 302, cockpit portion 304, tail portion 306, rudder portion 307, right wing portion 308, left wing portion 310, right aileron portion 312, left aileron portion 314, right engine portion 316, and left engine portion 318. Plurality of image portions 303 represents the different aircraft sections or aircraft regions of an aircraft that are of interest.

In this illustrative example, a total display area for display 300 may be defined by identifying top boundary 320, left boundary 322, bottom boundary 324, and right boundary 326 of display 300. Identifying the boundaries of display 300 allows the coordinates for the four corners formed by these boundaries to be identified. In particular, the x,y-coordinates for each corner may be identified. In particular, the coordinates for first corner 328, second corner 330, third corner 332, and fourth corner 334 may be identified. With these corner coordinates, the x,y-coordinates for center point 336 may also be identified. Center point 336 is the x,y center of display 300.

In some illustrative examples, the total display area for display 300 may also be three-dimensional and may have three-dimensional boundaries. In this manner, center point 336 may comprise three-dimensional coordinates, such as x,y,z-coordinates. In other illustrative examples, when other senses are being used, the total output area for the output device may be n-dimensional and have n-dimensional boundaries. Consequently, a center point of this total output area may comprise n-dimensional coordinates.

All of this information may be used to define a plurality of display areas within display 300 corresponding to plurality of image portions 303 of aircraft image 301. These display areas are outlined in FIG. 4 below.

Figure 4:
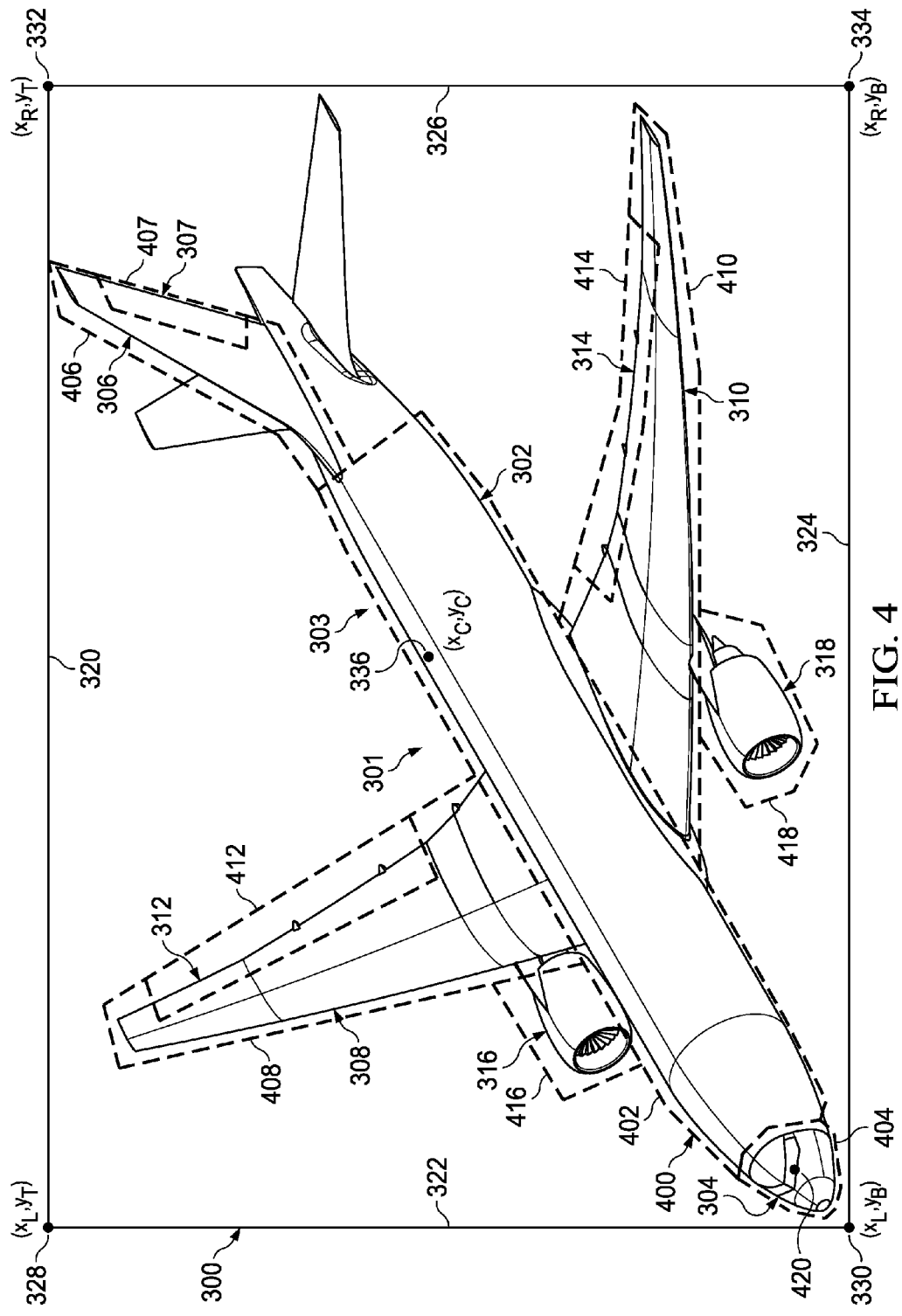
FIG. 4 is an illustration of display areas for the image portions of an aircraft image in accordance with an illustrative embodiment.

With reference now to FIG. 4, an illustration of display areas for the image portions of aircraft image 301 from FIG. 3 is depicted in accordance with an illustrative embodiment. In this illustrative example, plurality of display areas 400 has been defined within display 300.

As depicted, plurality of display areas 400 includes fuselage display area 402, cockpit display area 404, tail display area 406, rudder display area 407, right wing display area 408, left wing display area 410, right aileron display area 412, left aileron display area 414, right engine display area 416, and left engine display area 418. Fuselage display area 402, cockpit display area 404, tail display area 406, rudder display area 407, right wing display area 408, left wing display area 410, right aileron display area 412, left aileron display area 414, right engine display area 416, and left engine display area 418 contain fuselage portion 302, cockpit portion 304, tail portion 306, rudder portion 307, right wing portion 308, left wing portion 310, right aileron portion 312, left aileron portion 314, right engine portion 316, and left engine portion 318, respectively.

In one illustrative example, coordinates may be identified for each of the display areas identified. For example, without limitation, a leftmost x-coordinate, a rightmost x-coordinate, a topmost y-coordinate, and a bottommost y-coordinate may be identified for each of the display areas. These coordinates may be used to establish a width and a height for each of the display areas.

A reference center point for each of the display areas may then be identified using the coordinates, the width and height, or both. For example, cockpit center point 420 may be identified for cockpit display area 404. Thereafter, a distance from the reference center point identified for each of the display areas to center point 336 is identified.

With reference now to FIG. 5, an illustration of a table indicating the energy usage of the different aircraft sections of an aircraft is depicted in accordance with an illustrative embodiment. Table 500 has column 502, column 503, and column 504.

Column 502 identifies the different aircraft sections of the aircraft represented by aircraft image 301 in FIGS. 3-4. Column 503 identifies the energy usage for each of the aircraft sections. In this illustrative example, energy usage is an example of a measurable factor of interest, such as measurable factor of interest 126 in FIG. 1. Column 504 identifies the scale factor that may be calculated for the image portions corresponding to the aircraft sections identified in column 502.

Row 506 indicates that the fuselage of the aircraft has an energy usage with a value of low. Row 506 further indicates that the corresponding scale factor to be used for fuselage portion 302 of aircraft image 301 in FIGS. 3-4 is 1.

Row 508 indicates that the cockpit of the aircraft has an energy usage with a value of high. Row 508 further indicates that the corresponding scale factor to be used for cockpit portion 304 of aircraft image 301 in FIGS. 3-4 is 2.

Row 510 indicates that the right engine of the aircraft has an energy usage with a value of very high. Row 510 further indicates that the corresponding scale factor to be used for right engine portion 316 of aircraft image 301 in FIGS. 3-4 is 3.

The scale factors identified in column 504 may be used to modify the corresponding image portions of aircraft image 301 in FIGS. 3-4. In particular, these scale factors may be used to resize the display areas of display 300 corresponding to these image portions to resize the image portions.

Figure 6:
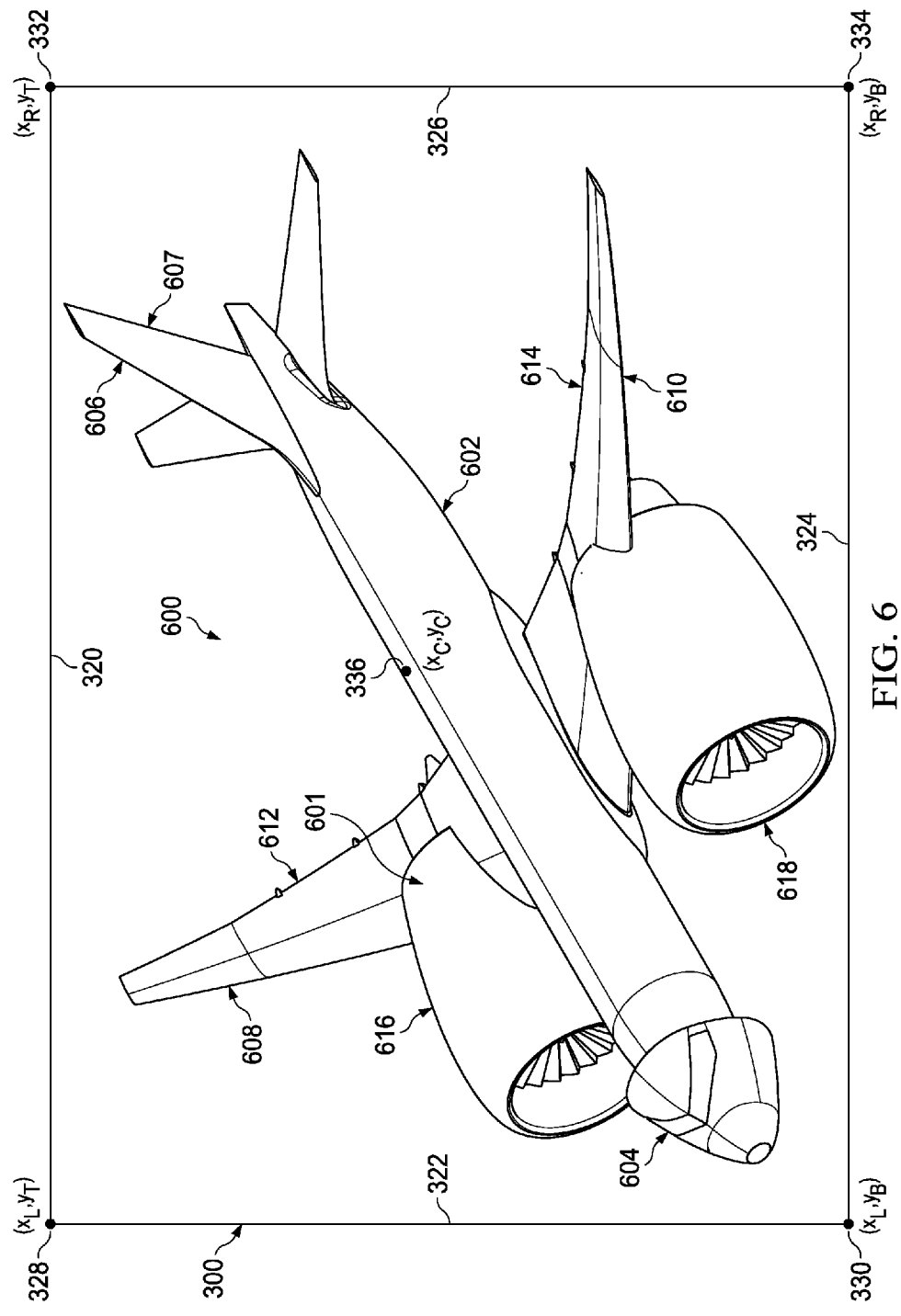
FIG. 6 is an illustration of a display of a transformed aircraft image in accordance with an illustrative embodiment.

With reference now to FIG. 6, an illustration of a display of a transformed aircraft image is depicted in accordance with an illustrative embodiment. In this illustrative example, aircraft image 301 in FIGS. 3-4 has been transformed into transformed aircraft image 600 within display 300. In particular, scale factors identified in column 504 of table 500 in FIG. 5 have been used to modify the image portions of aircraft image 301 in FIGS. 3-4 to form transformed aircraft image 600.

Transformed aircraft image 600 includes plurality of modified image portions 601 that have been modified based on the scale factors identified in column 504 in table 500 in FIG. 5. In particular, each of plurality of image portions 303 from FIG. 3 has been increased in size by the corresponding scale factor in FIG. 5.

In this illustrative example, the width and height of each of plurality of display areas 400 in FIG. 4 may be linearly scaled by the corresponding scale factor to form the corresponding modified image portion. Further, in this illustrative example, each modified image portion may be centered within display 300 at the previously calculated reference center point for the corresponding original display area. The type of transformed entity image that results may be referred to as an overlapping transformed entity image.

In other illustrative examples, the new modified image portion may be centered about a new center point within display 300. For example, the distance from the previously calculated reference center point for the original display area to display center point 336 may be scaled by the corresponding scale factor. The new modified image portion may be centered at a new center point having the scaled distance away from center point 336. The type of transformed entity image that results by performing this process for each of the modified image portions may be referred to as an exploded, transformed entity image.

In some cases, this type of process may result in transformed aircraft image 600 requiring a larger display area. Consequently, transformed aircraft image 600 may then be adjusted in the entirety such that transformed aircraft image 600 may be displayed within the original total display area of display 300. In particular, transformed aircraft image 600 may be scaled to fit within the original total display area of display 300.

Plurality of modified image portions 601 include modified fuselage portion 602, modified cockpit portion 604, modified tail portion 606, modified rudder portion 607, modified right wing portion 608, modified left wing portion 610, modified right aileron portion 612, modified left aileron portion 614, modified right engine portion 616, and modified left engine portion 618. As depicted, modified cockpit portion 604 is larger than cockpit portion 304 in FIG. 3. Further, modified right engine portion 616 and modified left engine portion 618 are larger than right engine portion 316 and left engine portion 318, respectively, in FIG. 3.

Modified cockpit portion 604, modified right engine portion 616, and modified left engine portion 618 are larger, proportionally, than the other modified portions of transformed aircraft image 600. The proportionally increased size of modified cockpit portion 604, modified right engine portion 616, and modified left engine portion 618 provides an understanding, at a glance, that the cockpit, right engine, and left engine, respectively, have increased energy usage as compared to the other aircraft sections. In this manner, the relative significance of the aircraft sections represented by plurality of modified image portions 601 with respect to energy usage may be quickly and easily understood using transformed aircraft image 600.

Figure 7:
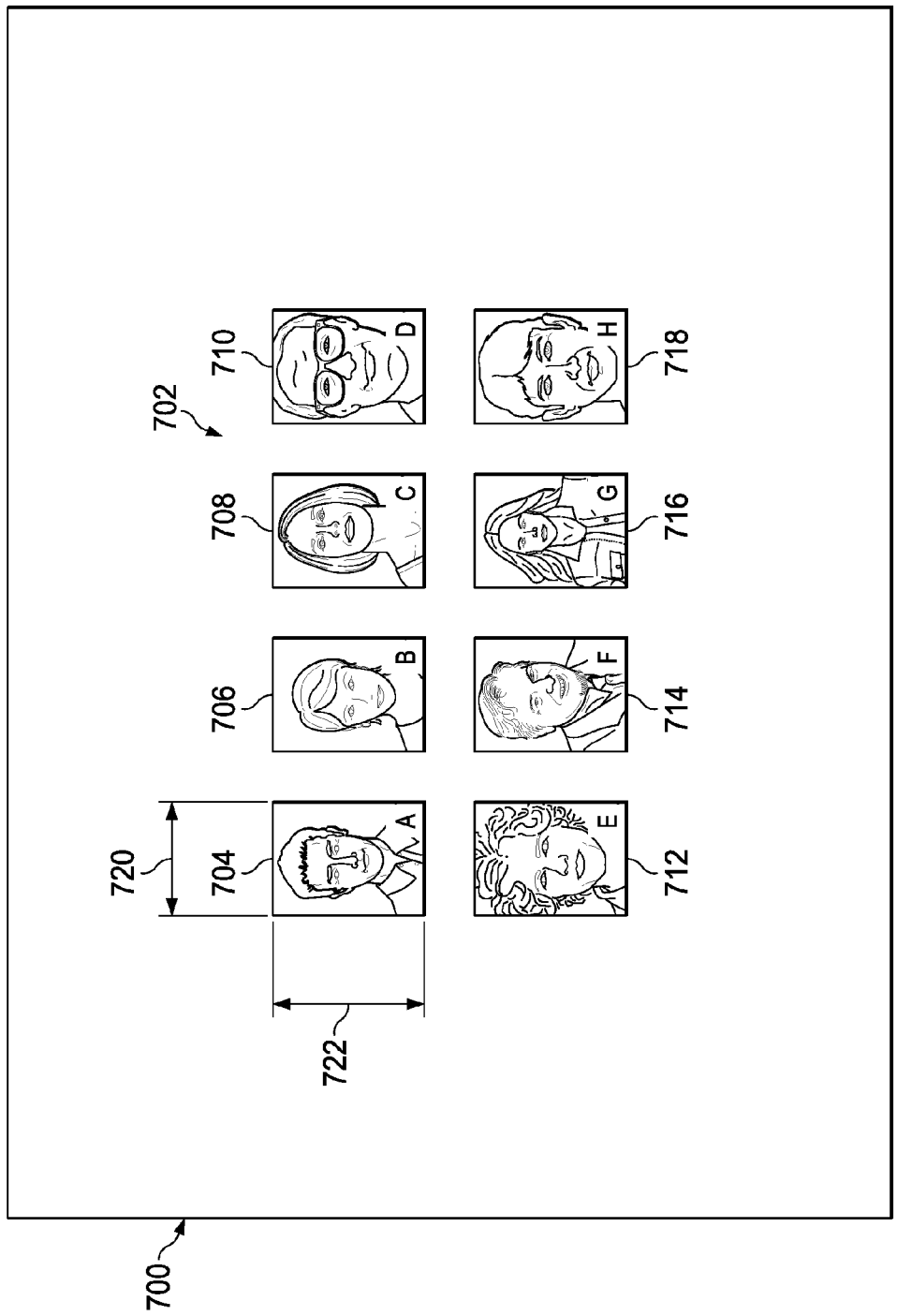
FIG. 7 is an illustration of a display of a picture cloud representing a social networking group in accordance with an illustrative embodiment.

With reference now to FIG. 7, an illustration of display of a picture cloud representing a social networking group is depicted in accordance with an illustrative embodiment. In this illustrative example, picture cloud 700 is an example of one implementation for entity sensory representation 102 in FIG. 1. In particular, picture cloud 700 may be an example of one implementation for entity image 142 in FIG. 1.

Picture cloud 700 visually represents a social networking group. This social networking group may be a singular group in which the members of the social networking group are grouped based on one or more factors. As one illustrative example, the social networking group may be comprised of members that have signed up on a dating website, a group of buyers, a group of sellers, or some other type of group. As depicted, picture cloud 700 includes plurality of member pictures 702, which may be an example of one implementation for plurality of image portions 144 in FIG. 1. Plurality of member pictures 702 includes member pictures 704, 706, 708, 710, 712, 714, 716, and 718.

Plurality of member pictures 702 represents the plurality of members in the social networking group. The measurable factor of interest for each of the plurality of members may be a level of social networking activity for each member. The value for this level of social networking activity may be the number of posts created by each member.

In this illustrative example, each of plurality of member pictures 702 may be considered at "baseline." In particular, each of plurality of member pictures 702 has a same width 720 and height 722.

Figure 8:
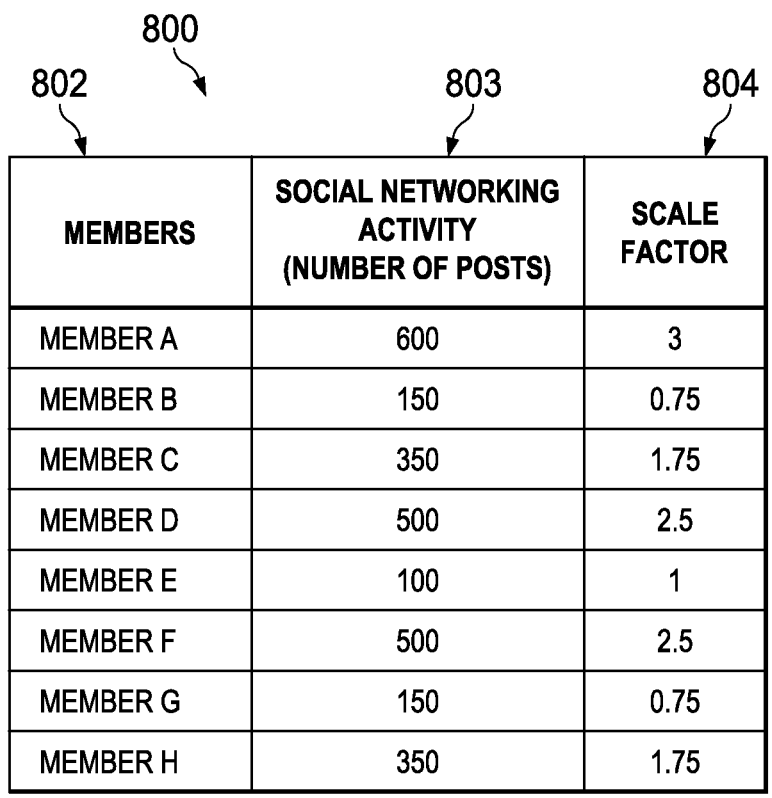
FIG. 8 is an illustration of a table indicating the social networking activity of members in a social networking group in accordance with an illustrative embodiment.

With reference now to FIG. 8, an illustration of a table indicating the social networking activity of members in a social networking group is depicted in accordance with an illustrative embodiment. In this illustrative example, table 800 has column 802, column 803, and column 804.

Column 802 identifies the different members of the social network group represented by plurality of member pictures 702 in FIG. 7. Column 803 identifies the social networking activity of each of the members based on the number of posts created by each member. Column 804 identifies the scale factor calculated for each of plurality of member pictures 702 based on the values for social networking activity of the members represented by plurality of member pictures 702 identified in column 803.

Figure 9:
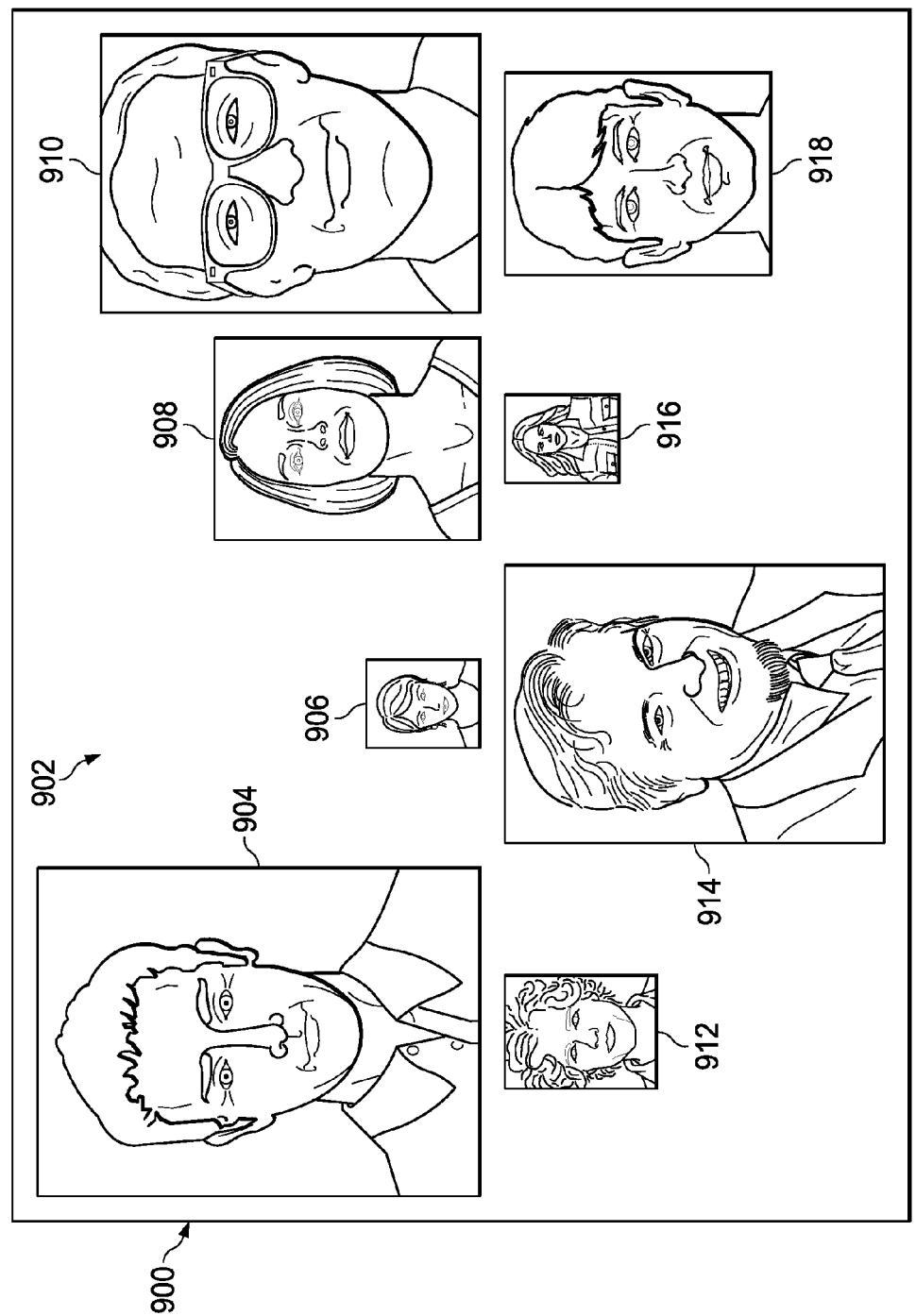
FIG. 9 is an illustration of a display of a transformed picture cloud in accordance with an illustrative embodiment.

With reference now to FIG. 9, an illustration of a display of a transformed picture cloud is depicted in accordance with an illustrative embodiment. In this illustrative example, picture cloud 700 from FIG. 7 has been transformed using the scale factors identified in column 804 in FIG. 8 to form transformed picture cloud 900. Transformed picture cloud 900 may be an example of one implementation for transformed entity image 148 in FIG. 1.

Transformed picture cloud 900 includes plurality of modified member pictures 902. In this illustrative example, each of plurality of member pictures 702 from FIG. 7 has been resized using the corresponding scale factor identified in column 804 to form plurality of modified member pictures 902. Plurality of modified member pictures 902 includes modified member pictures 904, 906, 908, 910, 912, 914, 916, and 918, which are the modified versions of member pictures 704, 706, 708, 710, 712, 714, 716, and 718, respectively, in FIG. 7.

In some cases, the relative position of each of plurality of modified member pictures 902 within transformed picture cloud 900 may be determined based on scale factors used to perform the transformation. For example, plurality of modified member pictures 902 may be arranged from largest scale factor to smallest scale factor in a left to right direction, in a clockwise manner, or in some other manner.

Figures 10, 11:
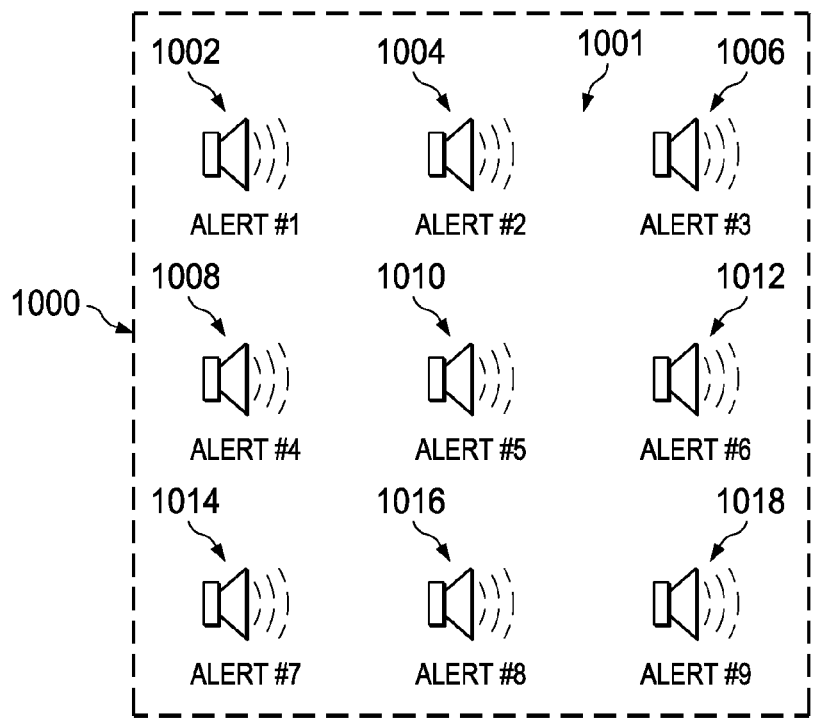
FIG. 10 is an illustration of an audio recording group representing an alert system in accordance with an illustrative embodiment.
FIG. 11 is an illustration of a table indicating the threat level for alerts in an alert system in accordance with an illustrative embodiment.

With reference now to FIG. 10, an illustration of an audio recording group representing an alert system is depicted in accordance with an illustrative embodiment. In this illustrative example, audio recording group 1000 is an example of one implementation for entity sensory representation 102 in FIG. 1. Audio recording group 1000 may represent an alert system.

As depicted, audio recording group 1000 includes plurality of audio recordings 1001 that represent a plurality of alerts that form the alert system. Plurality of audio recordings 1001 may be an example of one implementation for plurality of sensory representations 112 in FIG. 1.

Each of the plurality of alerts may be an alert that indicates a threat to a particular room in a building as identified by a security system. The measurable factor of interest for these alerts may be the threat level. The value for the threat level may be selected from one of very minor, minor, moderate, serious, and very serious.

Plurality of audio recordings 1001 includes audio recordings 1002, 1004, 1006, 1008, 1010, 1012, 1014, 1016, and 1018. In this illustrative example, each of plurality of audio recordings 1001 is at a baseline at which each audio recording is configured to play with a same loudness or decibel level. This baseline may be set to, for example, a moderate threat level.

With reference now to FIG. 11, an illustration of a table indicating the threat level for alerts in an alert system is depicted in accordance with an illustrative embodiment. In this illustrative example, table 1100 includes column 1102, column 1103, and column 1104.

Column 1102 identifies the different alerts represented by plurality of audio recordings 1001 in FIG. 10. Column 1103 identifies a current threat level for each of these alerts. Column 1104 identifies the scale factor calculated for use in modifying each of plurality of audio recordings 1001 in FIG. 10 based on the threat level of the corresponding alert.

Figure 12:
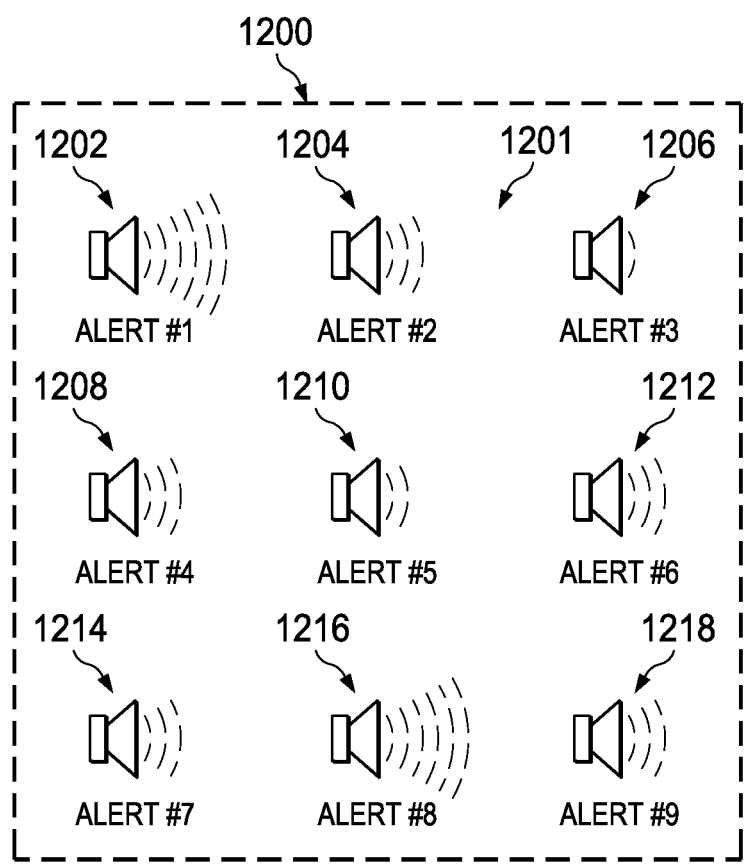
FIG. 12 is an illustration of a transformed audio recording group in accordance with an illustrative embodiment.

With reference now to FIG. 12, an illustration of a transformed audio recording group is depicted in accordance with an illustrative embodiment. In this illustrative example, audio recording group 1000 from FIG. 10 has been transformed into transformed audio recording group 1200. Transformed audio recording group 1200 is another example of one implementation for transformed entity sensory representation 104 in FIG. 1.

Transformed audio recording group 1200 includes plurality of modified audio recordings 1201, which may be another example of one implementation for plurality of modified sensory representations 132 in FIG. 1. Each of plurality of audio recordings 1001 in FIG. 10 has been modified using the corresponding scale factor identified in FIG. 11 to form plurality of modified audio recordings 1201.

As depicted, plurality of modified audio recordings 1201 includes modified audio recordings 1202, 1204, 1206, 1208, 1210, 1212, 1214, 1216, and 1218. Modified audio recordings 1202, 1204, 1206, 1208, 1210, 1212, 1214, 1216, and 1218 may be the modified versions of audio recordings 1002, 1004, 1006, 1008, 1010, 1012, 1014, 1016, and 1018, respectively.

Plurality of modified audio recordings 1201 may be played in succession, one after the other. A user, listening to plurality of modified audio recordings 1201, may be able to quickly and easily understand the relative significance with respect to the threat level of each of the alerts represented by plurality of modified audio recordings 1201. For example, alerts corresponding to higher threat levels may be played at higher volumes as compared to alerts corresponding to lower threat levels. With this type of understanding, a user may, for example, be able to quickly and easily determine which of the alerts, and thereby rooms in the building, may need to be addressed first.

In another illustrative example, a particular modified audio recording in plurality of modified audio recordings 1201 may be played throughout an entire building or other area when the corresponding alert is appropriate. The volume at which the modified audio recording is played may provide an understanding of the threat level associated with that alert.

Figure 13:
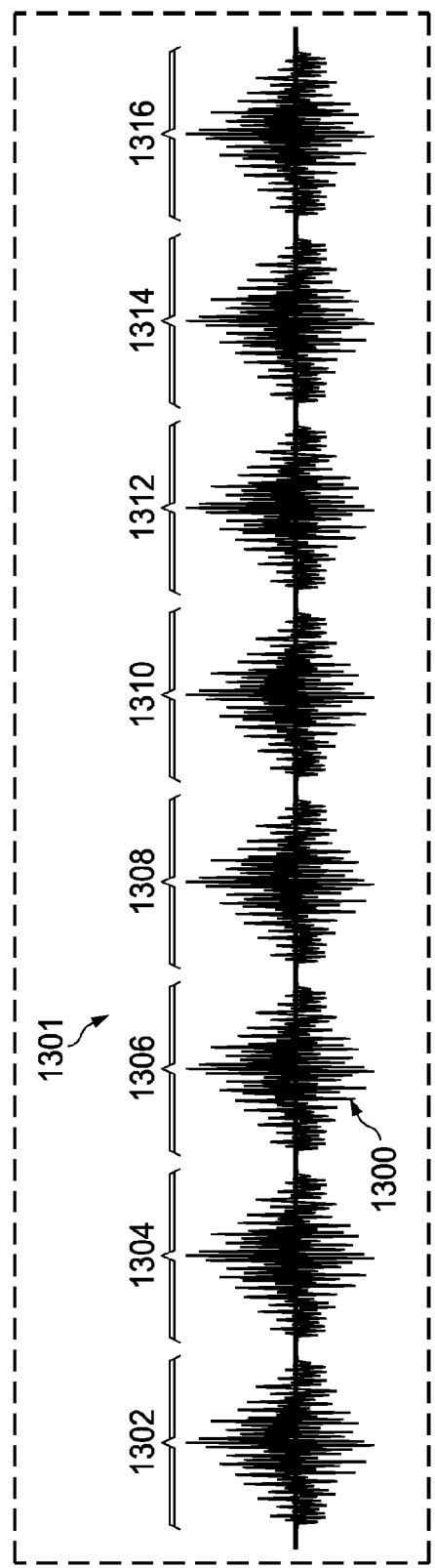
FIG. 13 is an illustration of an audio recording representing manufacturing instructions in accordance with an illustrative embodiment.

With reference now to FIG. 13, an illustration of an audio recording representing manufacturing instructions is depicted in accordance with an illustrative embodiment. In this illustrative example, audio recording 1300 may be an example of one implementation for entity sensory representation 102 in FIG. 1.

Audio recording 1300 represents manufacturing instructions. In particular, audio recording 1300 may be a recording of a human operator providing verbal instructions for performing a manufacturing operation.

As depicted, audio recording 1300 includes plurality of sections 1301. Plurality of sections 1301 may be an example of one implementation for plurality of sensory representations 112 in FIG. 1. Each of plurality of sections 1301 may represent the instructions for performing a different step of the manufacturing operation.

In this illustrative example, plurality of sections 1301 includes sections 1302, 1304, 1306, 1308, 1310, 1312, 1314, and 1316. Each of plurality of sections 1301 is at baseline in this example. In particular, each of plurality of sections 1301 is configured to play at a same loudness or similar decibel level.

Figure 14:
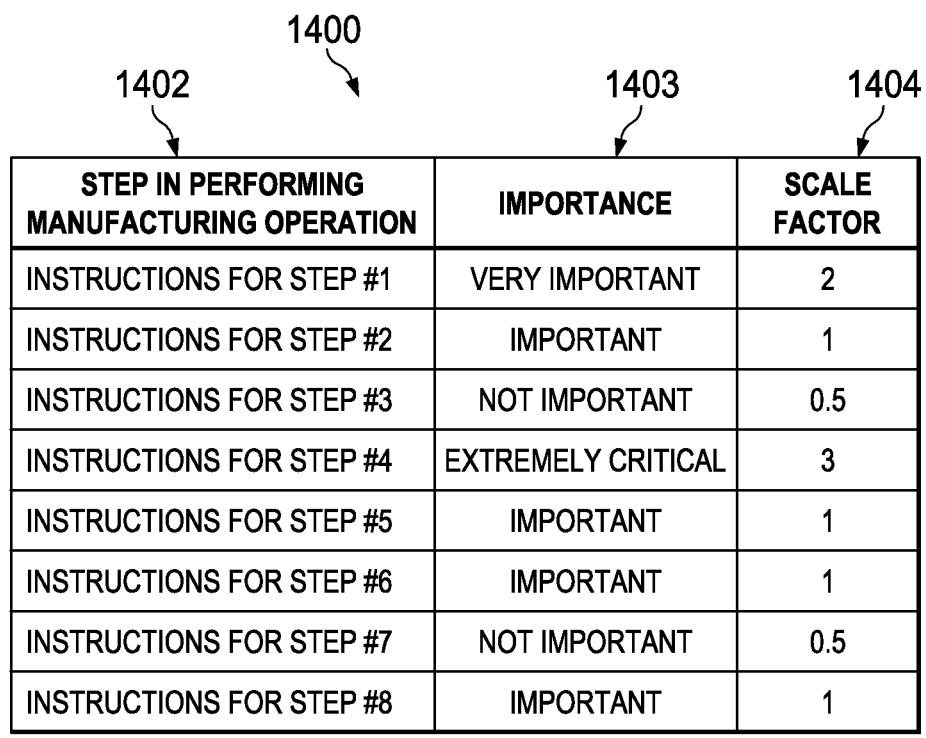
FIG. 14 is an illustration of a table indicating the importance of the different steps for performing a manufacturing operation in accordance with an illustrative embodiment.

With reference now to FIG. 14, an illustration of a table indicating the importance of the different steps for performing a manufacturing operation is depicted in accordance with an illustrative embodiment. In this illustrative example, table 1400 includes column 1402, column 1403, and column 1404.

Column 1402 identifies the different steps for which instructions are provided by audio recording 1300 in FIG. 13. Column 1403 identifies the importance assigned to the different steps. Column 1404 identifies the scale factors calculated for plurality of sections 1301 representing the instructions for the different steps. These scale factors may be used to modify a loudness of each of plurality of sections 1301.

Figure 15:
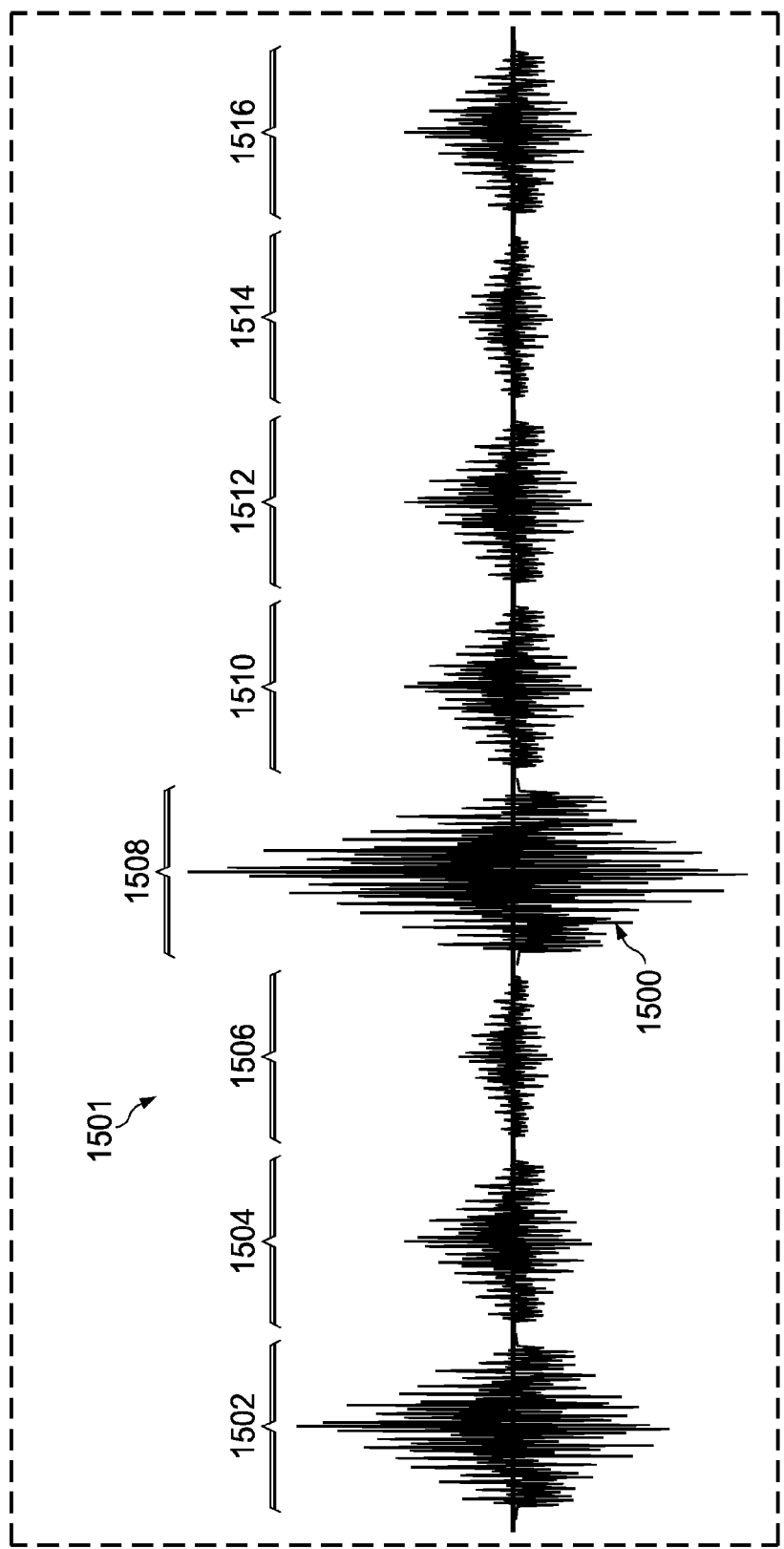
FIG. 15 is an illustration of a transformed audio recording in accordance with an illustrative embodiment.

With reference now to FIG. 15, an illustration of a transformed audio recording is depicted in accordance with an illustrative embodiment. In this illustrative example, audio recording 1300 from FIG. 13 has been transformed into transformed audio recording 1500. Transformed audio recording 1500 is yet another example of one implementation for transformed entity sensory representation 104 in FIG. 1.

Transformed audio recording 1500 includes plurality of modified sections 1501. Plurality of modified sections 1501 includes modified sections 1502, 1504, 1506, 1508, 1510, 1512, 1514, and 1516. The loudness of each of plurality of sections 1301 has been adjusted based on the corresponding scale factor identified in FIG. 14 for the corresponding step represented by each section to form plurality of modified sections 1501.

When transformed audio recording 1500 is played to a user, the user may be able to quickly and easily understand which portions of the audio instructions to which the user should pay close attention. Plurality of modified sections 1501 provides the user with a sensory understanding of the relative importance of the plurality of steps represented by plurality of modified sections 1501.

The illustrations in FIGS. 2-15 are not meant to imply physical, architectural, or logical limitations to the manner in which an illustrative embodiment may be implemented. Other elements in addition to or in place of the ones illustrated may be used. Some elements may be optional. For example, other graphical features may be added to display 300 in FIG. 6 to indicate the relative energy usage of the different aircraft sections in addition to the resizing of the image portions.

Figure 16:
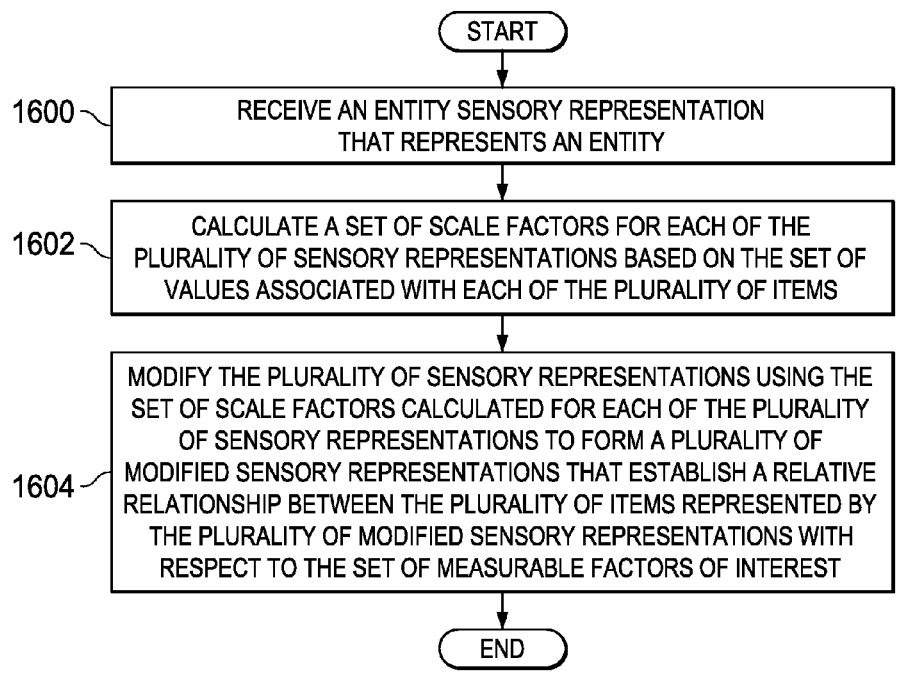
FIG. 16 is an illustration of a process for modifying an entity sensory representation that represents an entity in the form of a flowchart in accordance with an illustrative embodiment.

With reference now to FIG. 16, an illustration of a process for modifying an entity sensory representation that represents an entity is depicted in the form of a flowchart in accordance with an illustrative embodiment. The process illustrated in FIG. 16 may be implemented using transformer 100 in FIG. 1 to transform an entity sensory representation, such as entity sensory representation 102 in FIG. 1.

The process may begin by receiving an entity sensory representation that represents an entity (operation 1600). In operation 1600, the entity sensory representation comprises a plurality of sensory representations that represent a plurality of items that are part of the entity. Each of the plurality of items may be associated with a set of values for a set of measurable factors of interest.

Next, a set of scale factors is calculated for each of the plurality of sensory representations based on the set of values associated with each of the plurality of items (operation 1602). The plurality of sensory representations may then be modified using the set of scale factors calculated for each of the plurality of sensory representations to form a plurality of modified sensory representations that establish a relative relationship between the plurality of items represented by the plurality of modified sensory representations with respect to the set of measurable factors of interest (operation 1604), with the process terminating thereafter.

Figure 17:
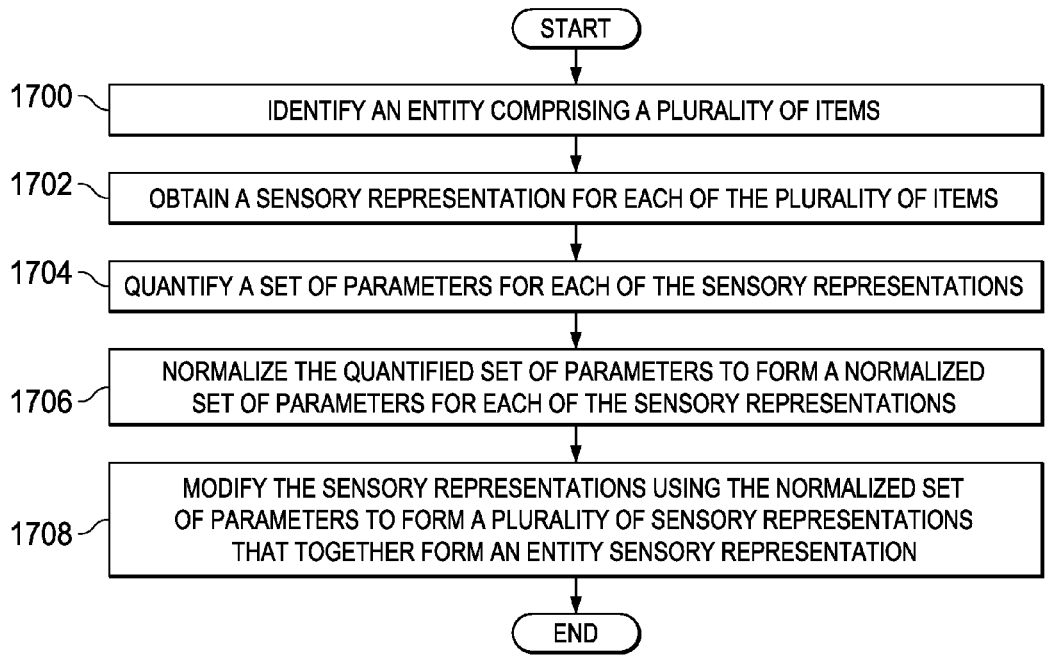
FIG. 17 is an illustration of a process for creating an entity sensory representation in the form of a flowchart in accordance with an illustrative embodiment.

With reference now to FIG. 17, an illustration of a process for creating an entity sensory representation is depicted in the form of a flowchart in accordance with an illustrative embodiment. The process illustrated in FIG. 17 may be implemented to form an entity sensory representation, such as entity sensory representation 102 in FIG. 1.

The process begins by identifying an entity comprising a plurality of items (operation 1700). In one illustrative example, the entity may be identified in operation 1700 by a computer system, such as computer system 106 in FIG. 1, receiving input comprising one or more n-dimensional arrays of items. In operation 1700, the one or more n-dimensional arrays of items may be stored in the computer system using one or more data structures.

Next, a sensory representation is obtained for each of the plurality of items (operation 1702). In operation 1702, the sensory representations may be obtained by receiving the sensory representations as input at the computer system, retrieving the sensory representations from a database or cloud storage, creating new sensory representations, or in some other manner.

As one illustrative example, the sensory representations obtained in operation 1702 may take the form of images. The images may be received as input from an imaging system; retrieved from a database, server system, or cloud storage; created based on predetermined criteria or specifications; created by a user using a graphics program; or obtained in some other manner.

Thereafter, a set of parameters is quantified for each of the sensory representations (operation 1704). In operation 1704, a value for each of the set of parameters may be acquired, measured, or quantified in some other manner for each of the plurality of sensory representations. When the sensory representations are images, the set of parameters may include a width and height in pixels.

Next, the quantified set of parameters may be normalized to form a normalized set of parameters for each of the sensory representations (operation 1706). The sensory representations are then modified using the normalized set of parameters to form a plurality of sensory representations that together form an entity sensory representation (operation 1708), with the process terminating thereafter.

In operation 1708, each of the plurality of sensory representations may be set to a same baseline. When the plurality of sensory representations take the form of images, the width and height of the images may be normalized in operation 1706 such that each of the images may be modified in operation 1708 to have a baseline width and a baseline height in pixels.

Figures 18, 19:
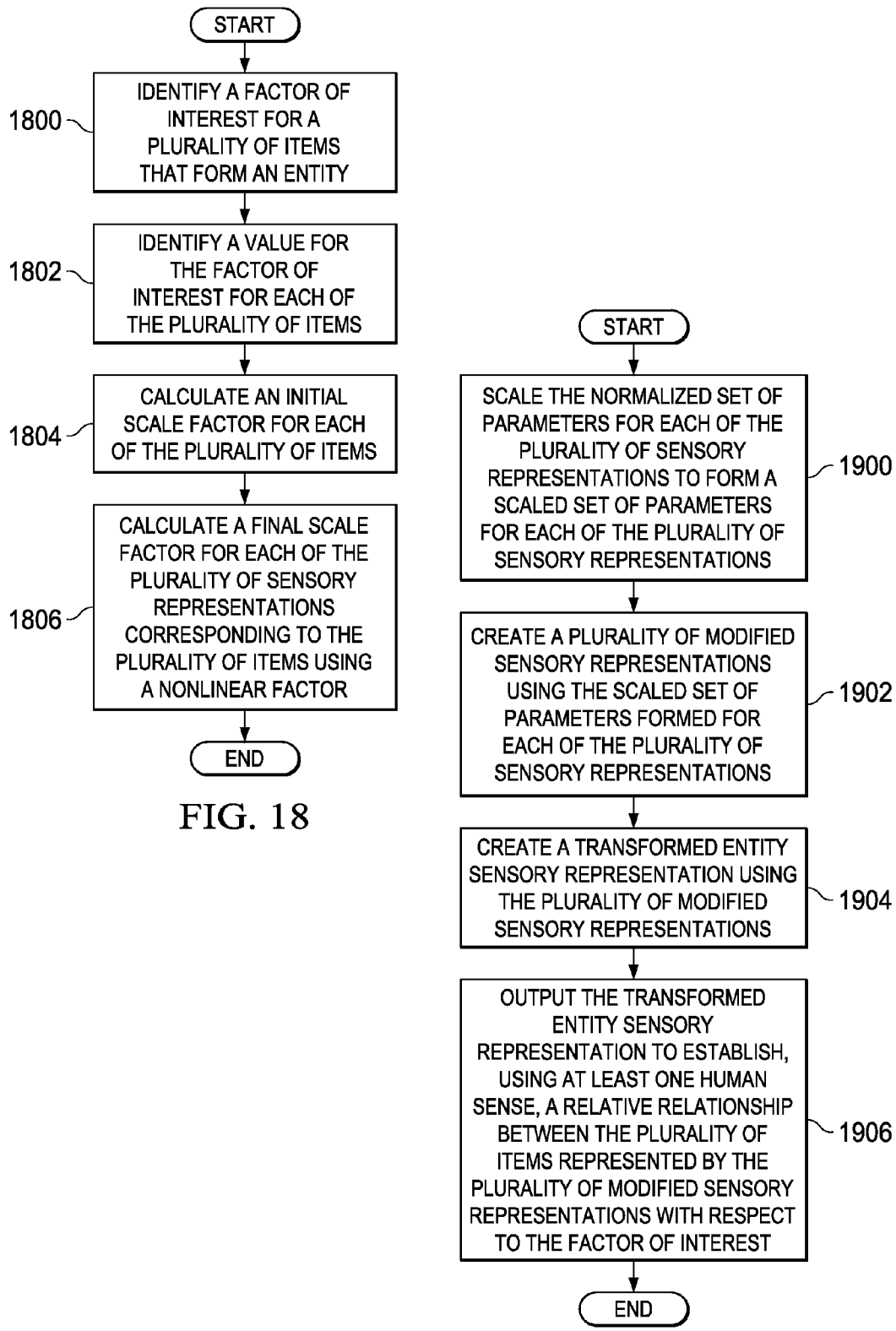
FIG. 18 is an illustration of a process for calculating a set of scale factors for each of a plurality of sensory representations that form an entity sensory representation in the form of a flowchart in accordance with an illustrative embodiment.
FIG. 19 is an illustration of a process for creating a transformed entity sensory representation in the form of a flowchart in accordance with an illustrative embodiment.

With reference now to FIG. 18, an illustration of a process for calculating a set of scale factors for each of a plurality of sensory representations that form an entity sensory representation is depicted in the form of a flowchart in accordance with an illustrative embodiment. The process illustrated in FIG. 18 may be implemented to identify a set of scale factors for, for example, each of plurality of sensory representations 112 in FIG. 1.

The process begins by identifying a factor of interest for a plurality of items that form an entity (operation 1800). In other illustrative examples, more than one factor of interest may be identified in operation 1800.

The factor of interest identified in operation 1800 may be measurable. Further, the factor of interest may be static or dynamic. When the factor of interest is static, a value measured for the factor of interest may not change over time. When the factor of interest is dynamic, a value measured for the factor of interest may change over time. Depending on the implementation, the factor of interest may be multi-dimensional. For example, the factor of interest may be a position that comprises three coordinates.

Next, a value for the factor of interest may be identified for each of the plurality of items (operation 1802). In operation 1802, the value may be quantified by at least one of performing a measurement, interpreting sensor data, converting subjective information into a value, or performing some other type of quantification.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, "at least one of item A, item B, or item C" or "at least one of item A, item B, and item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

Thereafter, an initial scale factor may be calculated for each of the plurality of items (operation 1804). In one illustrative example, the initial scale factor for a particular item may be calculated by dividing the value identified for the factor of interest for the particular item in operation 1802 by a sum of all of the values identified for the plurality of items. Of course, the initial scale factor may be computed in some other manner in other illustrative examples. In some cases, the scale factor may be referred to as a computed relative significance.

Next, a final scale factor may be calculated for each of the plurality of sensory representations corresponding to the plurality of items using a nonlinear factor (operation 1806), with the process terminating thereafter. In one illustrative example, the nonlinear factor may be a logarithmic factor. Operation 1806 may be performed by multiplying the initial scale factor identified for a particular item by the logarithmic factor and setting the product of this multiplication as the final scale factor for the corresponding sensory representation.

With reference now to FIG. 19, an illustration of a process for creating a transformed entity sensory representation is depicted in the form of a flowchart in accordance with an illustrative embodiment. The process illustrated in FIG. 19 may be implemented to transform the entity sensory representation formed by the process described in FIG. 17 using the scale factors identified for the plurality of sensory representations in the entity sensory representation as described in FIG. 18.

The process may begin by scaling the normalized set of parameters for each of the plurality of sensory representations to form a scaled set of parameters for each of the plurality of sensory representations (operation 1900). A plurality of modified sensory representations may be created using the scaled set of parameters formed for each of the plurality of sensory representations (operation 1902).

Then, a transformed entity sensory representation may be created using the plurality of modified sensory representations (operation 1904). Operation 1904 may be performed in any number of ways. For example, the plurality of modified sensory representations may be combined, overlapped, sequenced, positioned relative to each other, or manipulated in any number of ways to form transformed entity sensory representation.

The transformed entity sensory representation may then be output to establish, using at least one human sense, a relative relationship between the plurality of items represented by the plurality of modified sensory representations with respect to the factor of interest (operation 1906), with the process terminating thereafter. In other illustrative examples, the factor of interest may be a set of measurable factors of interest.

Figure 20A:
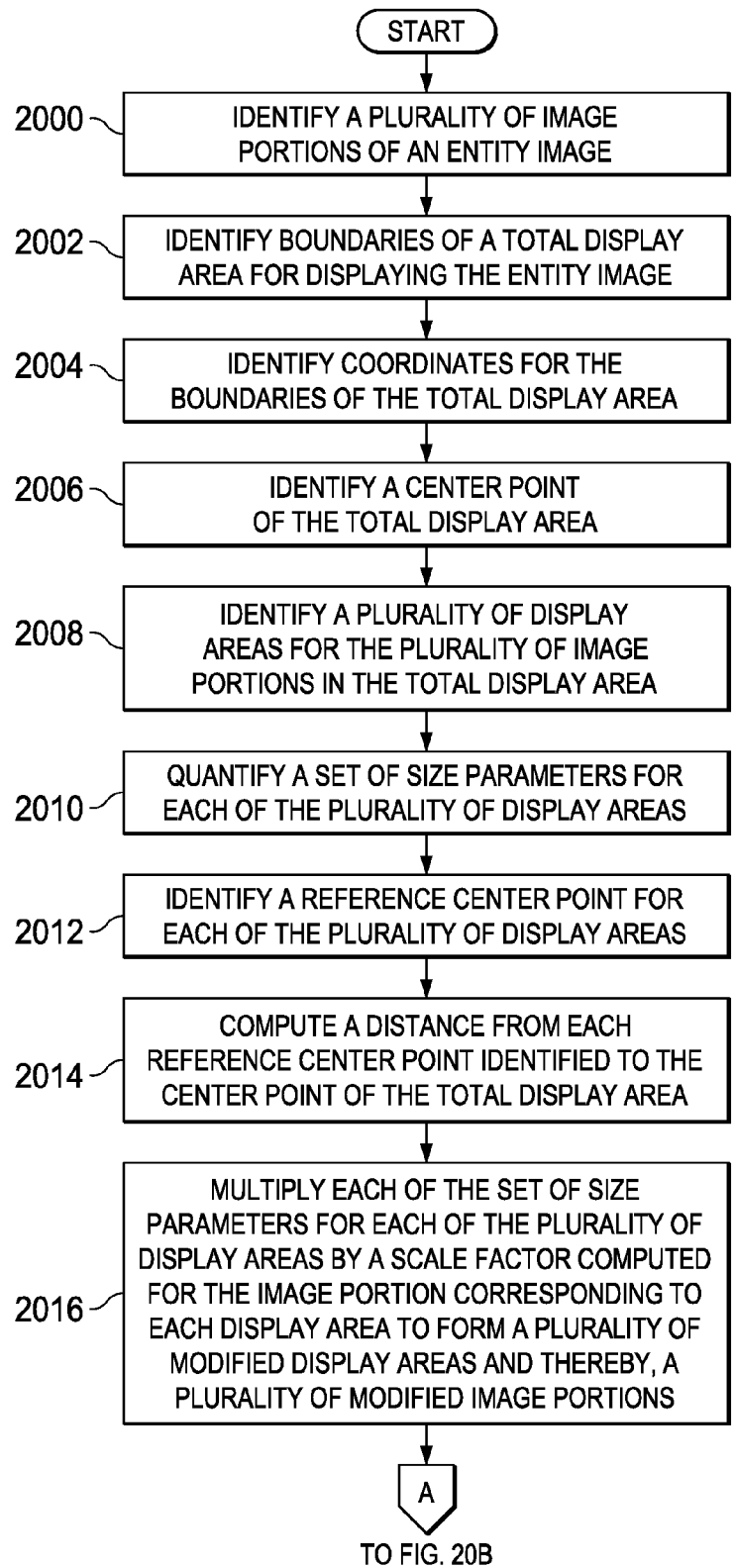
FIG. 20A and FIG. 20B are illustrations of a process for creating a transformed entity image in the form of a flowchart in accordance with an illustrative embodiment.
Figure 20B:
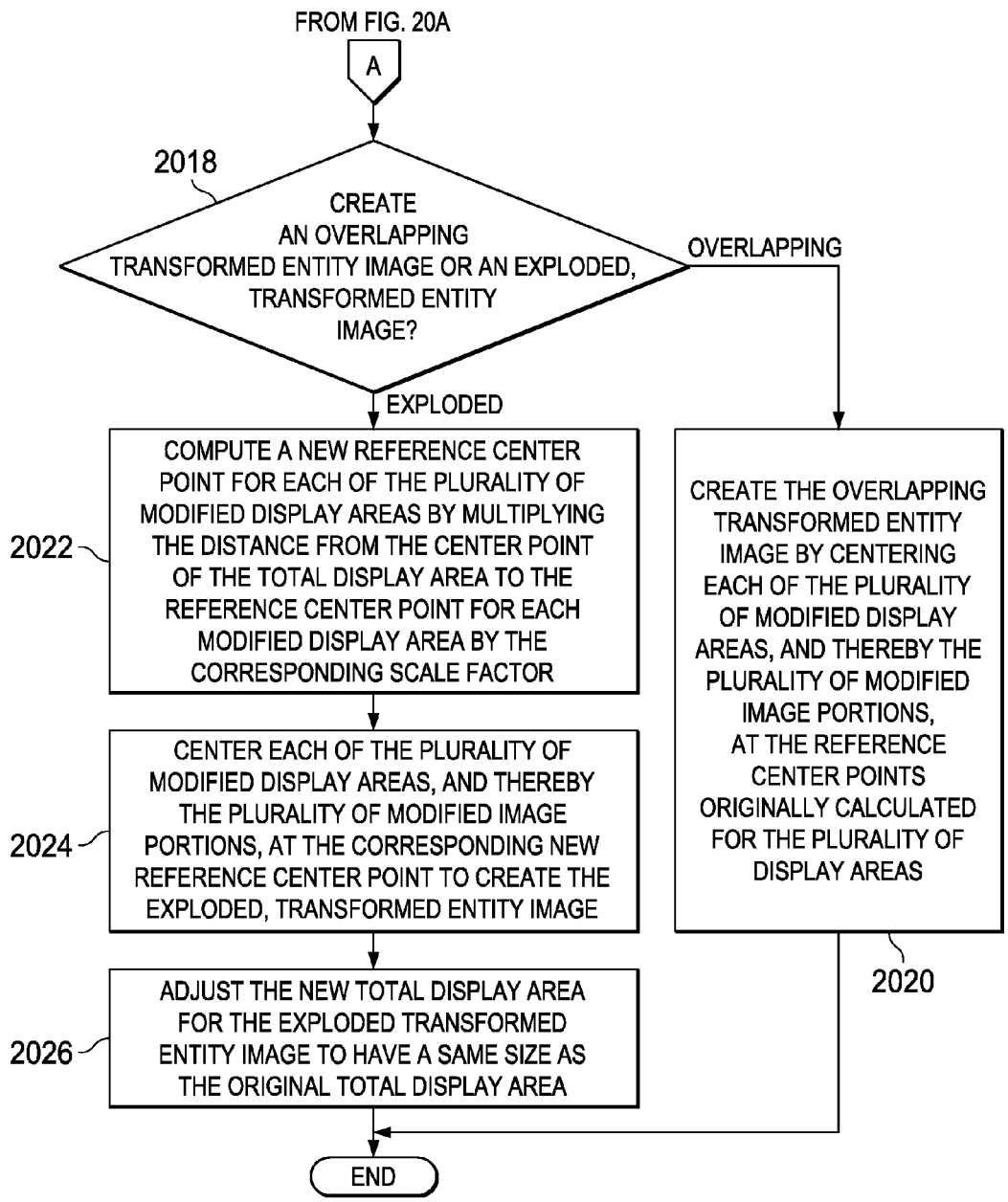

With reference now to FIGS. 20A and 20B, an illustration of a process for creating a transformed entity image is depicted in the form of a flowchart in accordance with an illustrative embodiment. The process illustrated in FIGS. 20A and 20B may be implemented to create, for example, without limitation, transformed entity image 148 in FIG. 1.

The process may begin by identifying a plurality of image portions of an entity image (operation 2000). Next, boundaries of a total display area for displaying the entity image are identified (operation 2002).

Coordinates for the boundaries of the total display area are then identified (operation 2004). Depending on the shape of the total display area, these coordinates may be for the corners of the total display area, starting end points and ending end points for the boundaries of the total display area, or for other types of points along the boundaries of the total display area. Then, a center point of the total display area is identified (operation 2006).

Thereafter, a plurality of display areas for the plurality of image portions is identified in the total display area (operation 2008). A set of size parameters are quantified for each of the plurality of display areas (operation 2010). In operation 2010, the set of size parameters for each of the plurality of display areas may include, for example, a width in pixels and a height in pixels for each display area.

Next, a reference center point may be identified for each of the plurality of display areas (operation 2012). A distance from each reference center point identified to the center point of the total display area is computed (operation 2014). In operation 2014, this distance may be calculated using Cartesian point-coordinates such as x,y-coordinates, or x,y, z-coordinates. In other examples, the distance may be calculated using distance-angle vectors in two dimensions, three dimensions, n-dimensions, or some combination thereof using some other type of distance measurement technique.

Each of the set of size parameters for each of the plurality of display areas is multiplied by a scale factor computed for the image portion corresponding to each display area to form a plurality of modified display areas and thereby, a plurality of modified image portions (operation 2016). In some cases, the resizing may be a one-to-one resizing. For example, resizing a display area by a scale factor of 1 may not change a size of the display area. Thus, the size of the corresponding image portion may not be changed.

A determination is then made as to whether an overlapping transformed entity image or an exploded transformed entity image is to be created (operation 2018). If an overlapping transformed entity image is to be created, the process then creates the overlapping transformed entity image by centering each of the plurality of modified display areas, and thereby the plurality of modified image portions, at the reference center points originally calculated for the plurality of display areas (operation 2020), with the process terminating thereafter.

In operation 2020, one or more of the plurality of modified image portions may overlap over other modified image portions. In some illustrative examples, the modified display areas, and thereby the modified image portions, may be added to the total display area starting from the modified image portion associated with the smallest scale factor and ending with the modified image portion associated with the largest scale factor. In this manner, a modified image portion representing an item with greater relative significance may overlap another modified image portion representing an item with lesser relative significance.

With reference again to operation 2018, if the exploded transformed entity image is to be created, the process computes a new reference center point for each of the plurality of modified display areas by multiplying the distance from the center point of the total display area to the reference center point for each modified display area by the corresponding scale factor (operation 2022). Next, each of the plurality of modified display areas, and thereby the plurality of modified image portions, may be centered at the corresponding new reference center point to create the exploded transformed entity image (operation 2024).

Thereafter, the new total display area for the exploded transformed entity image may be adjusted to have a same size as the original total display area (operation 2026), with the process terminating thereafter. In some illustrative examples, operation 2024 or operation 2026 may include adding lines to reconnect the plurality of modified image portions.

In some cases, a continuous relationship may be present between the sensory representations that make up an entity sensory representation. As one illustrative example, a continuous relationship may be present between the plurality of image portions identified in operation 2000 when the entity image is an aircraft and the plurality of image portions are parts of the aircraft. As another example, a continuous relationship may be present between segments of speech in an audio recording. When this type of continuous relationship is present in an entity image, it may be desirable to preserve this continuity between the plurality of modified portions that form an exploded transformed entity image.

For example, one or more techniques or algorithms may be used to create intermediary sensory representation content to preserve continuity between the plurality of modified image portions in the exploded transformed entity image formed in operation 2024 after the plurality of modified image portions have been centered at the corresponding new reference center points in operation 2024. The one or more techniques or algorithms used may include, for example, without limitation, an interpolation technique, a smoothing algorithm, a filling algorithm, an extrapolation technique, a linear extrapolation technique, a drawing technique, some other type of algorithm or technique, or some combination thereof.

In some illustrative examples, an operation similar to operation 2026 may be performed after operation 2020. In other words, in some cases, the new total display area for the overlapping transformed entity image may be adjusted to have a same size as the original total display area. In other illustrative examples, operation 2026 may be performed to adjust the new total display area to some other size.

Figure 21:
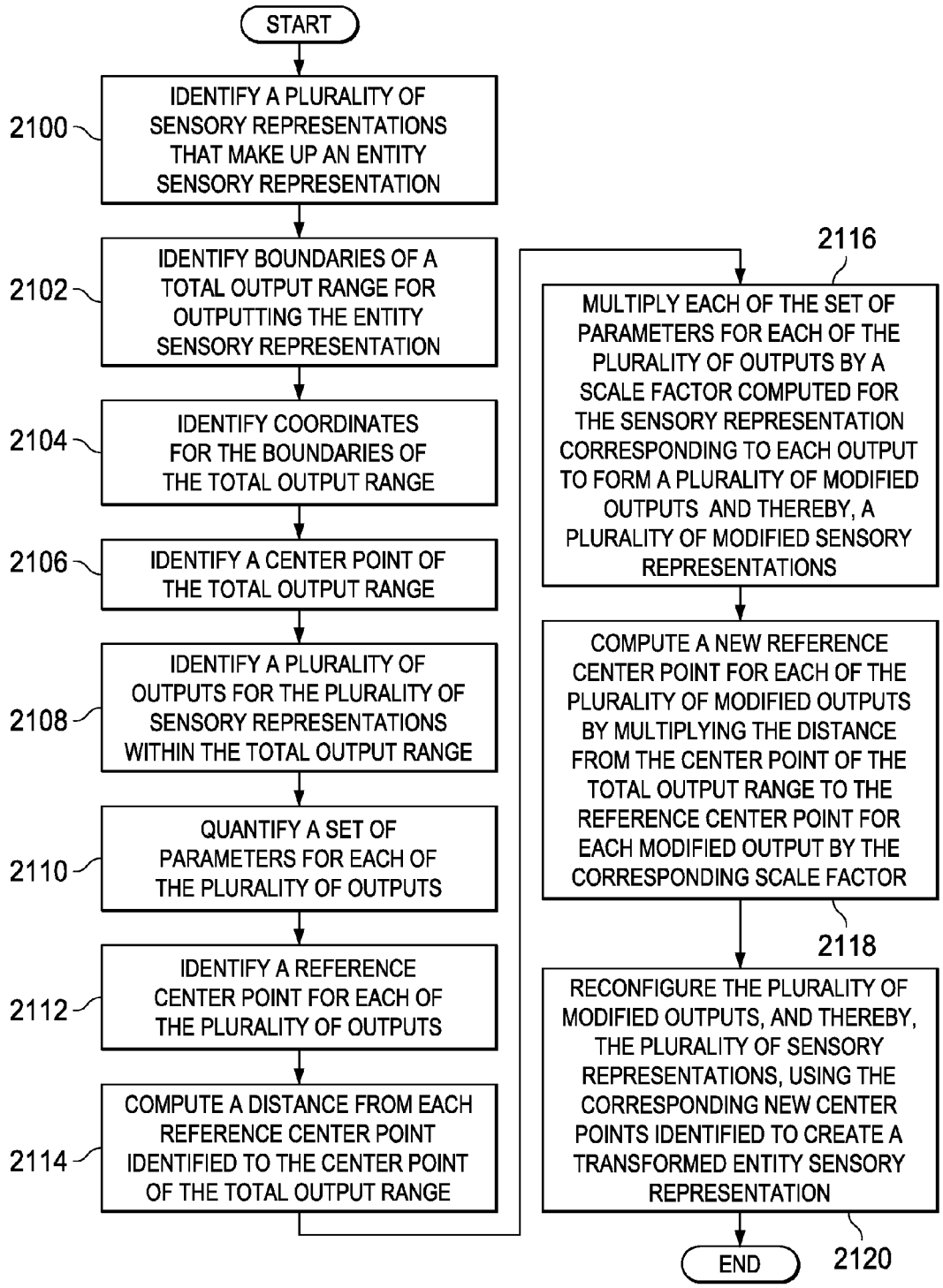
FIG. 21 is an illustration of a process for creating a transformed entity sensory representation in accordance with an illustrative embodiment.

With reference now to FIG. 21, an illustration of a process for creating a transformed entity sensory representation is depicted in accordance with an illustrative embodiment. The process illustrated in FIG. 21 may be used to create, for example, without limitation, transformed entity sensory representation 104 in FIG. 1.

The process may begin by identifying a plurality of sensory representations that make up an entity sensory representation (operation 2100). Next, boundaries of a total output range for outputting the entity sensory representation are identified (operation 2102). Coordinates of the boundaries of the total output range are then identified (operation 2104). Then, a center point of the total output range is identified (operation 2106).

With respect to operations 2102, 2104, and 2106, the total output range may take different forms, depending on the type of entity sensory representation being processed. When the entity sensory representation takes the form of audio, the boundaries of the total output range may correspond to one or more dimensions such as, for example, without limitation, time, frequency, sound pressure, and intensity.

As one illustrative example, the boundaries of the total output range for an audio recording, such as audio recording 1300 in FIG. 13, may take the form of parameters such as time and sound pressure. The coordinates for these boundaries may include, for example, a start time, and end time, and a maximum sound pressure level and minimum sound pressure level for the boundary corresponding to sound pressure. A center point for the total output range may be comprised of the middle time between the start and end times and the mid-point between the maximum and minimum sound pressure levels.

In another illustrative example, the boundaries for the audio recordings may take the form of parameters, such as frequency and one of volume, intensity, or sound pressure. When the boundaries are frequency and volume, the coordinates for these boundaries may include, for example, a lowest frequency and highest frequency and a maximum volume level and minimum volume level. The center point for the total output range may then be comprised of the mid-frequency point and the middle volume level. The mid-frequency point may be computed using linear or logarithmic measurements of the frequencies.

Thereafter, a plurality of outputs for the plurality of sensory representations is identified within the total output range (operation 2108). When the entity sensory representation is an audio recording and the plurality of sensory representations are sections of the audio recording, the plurality of outputs may be the corresponding sections of the total output range.

A set of parameters are quantified for each of the plurality of outputs (operation 2110). In operation 2110, the set of parameters for each of the plurality of outputs may include, for example, a frequency range, a volume range, a time interval, an intensity range, or some other type of parameter.

Next, a reference center point may be identified for each of the plurality of outputs (operation 2112). A distance from each reference center point identified to the center point of the total output range is computed (operation 2114). As one illustrative example, this distance may be a temporal distance in the case of audio.

Each of the set of parameters for each of the plurality of outputs is multiplied by a scale factor computed for the sensory representation corresponding to each output to form a plurality of modified outputs and thereby, a plurality of modified sensory representations (operation 2116). In operation 2116, when the sensory representation is audio, each output may be scaled in frequency, volume, time, intensity, sound pressure, or some other parameter.

A new reference center point may be computed for each of the plurality of modified outputs by multiplying the distance from the center point of the total output range to the reference center point for each modified output by the corresponding scale factor (operation 2118). Next, the plurality of modified outputs, and thereby the plurality of sensory representations, may be reconfigured using the corresponding new reference center points identified to create the transformed entity sensory representation (operation 2120), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In some illustrative examples, operation 1706 in FIG. 17 may be an optional step. In this manner, the normalized set of parameters formed in operation 1706 may be referred to as an optionally normalized set of parameters. In one illustrative example, the process described in FIG. 17 above may be made to terminate after operation 1704 such that the sensory representations with the quantified sets of parameters are used to form the entity sensory representation. In other illustrative examples, operation 1806 in FIG. 18 may be an optional step. When operation 1806 is not performed, the initial scale factor computed in operation 1804 for each of plurality of items may be used as the final scale factor for each corresponding sensory representation.

Figure 22:
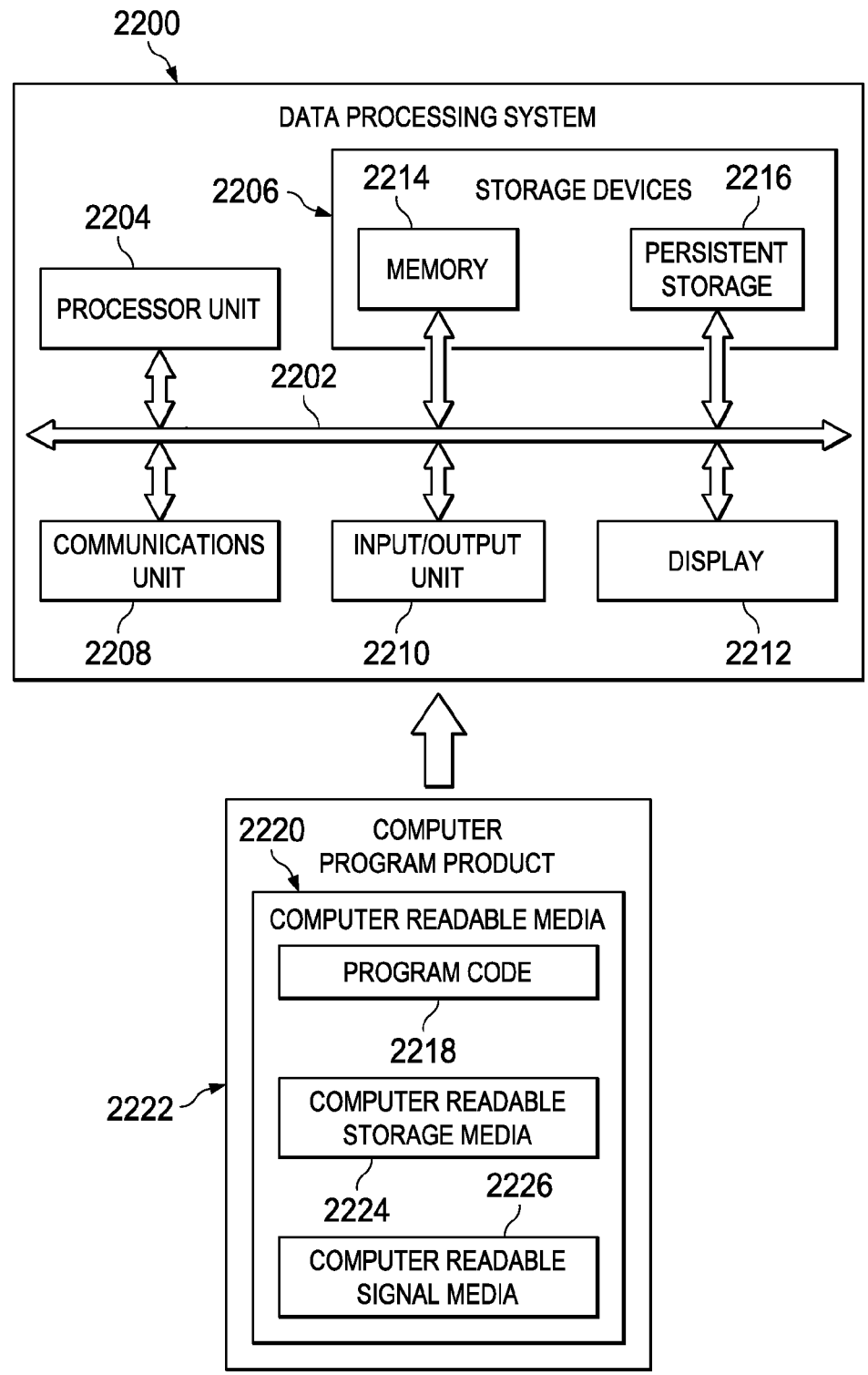
FIG. 22 is an illustration of a data processing system in the form of a block diagram in accordance with an illustrative embodiment.

Turning now to FIG. 22, an illustration of a data processing system is depicted in the form of a block diagram in accordance with an illustrative embodiment. Data processing system 2200 may be used to implement computer system 106 in FIG. 1. As depicted, data processing system 2200 includes communications framework 2202, which provides communications between processor unit 2204, storage devices 2206, communications unit 2208, input/output unit 2210, and display 2212. In some cases, communications framework 2202 may be implemented as a bus system.

Processor unit 2204 is configured to execute instructions for software to perform a number of operations. Processor unit 2204 may comprise at least one of a number of processors, a multi-processor core, or some other type of processor, depending on the implementation. In some cases, processor unit 2204 may take the form of a hardware unit, such as a circuit system, an application specific integrated circuit (ASIC), a programmable logic device, or some other suitable type of hardware unit.

Instructions for the operating system, applications and programs run by processor unit 2204 may be located in storage devices 2206. Storage devices 2206 may be in communication with processor unit 2204 through communications framework 2202. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 2214 and persistent storage 2216 are examples of storage devices 2206. Memory 2214 may take the form of, for example, a random access memory or some type of volatile or non-volatile storage device. Persistent storage 2216 may comprise any number of components or devices. For example, persistent storage 2216 may comprise a hard drive, a flash memory, a rewritable optical disk, a rewritable magnetic tape, or some combination of the above. The media used by persistent storage 2216 may or may not be removable.

Communications unit 2208 allows data processing system 2200 to communicate with other data processing systems, devices, or both. Communications unit 2208 may provide communications using physical communications links, wireless communications links, or both.

Input/output unit 2210 allows input to be received from and output to be sent to other devices connected to data processing system 2200. For example, input/output unit 2210 may allow user input to be received through a keyboard, a mouse, some other type of input device, or a combination thereof. As another example, input/output unit 2210 may allow output to be sent to a printer connected to data processing system 2200.

Display 2212 is configured to display information to a user. Display 2212 may comprise, for example, without limitation, a monitor, a touch screen, a laser display, a holographic display, a virtual display device, some other type of display device, or a combination thereof. Display 2212 may be an example of one manner in which display device 152 in FIG. 1 may be implemented.

In this illustrative example, the processes of the different illustrative embodiments may be performed by processor unit 2204 using computer-implemented instructions. These instructions may be referred to as program code, computer usable program code, or computer readable program code and may be read and executed by one or more processors in processor unit 2204.

In these examples, program code 2218 is located in a functional form on computer readable media 2220, which is selectively removable, and may be loaded onto or transferred to data processing system 2200 for execution by processor unit 2204. Program code 2218 and computer readable media 2220 together form computer program product 2222. In this illustrative example, computer readable media 2220 may be computer readable storage media 2224 or computer readable signal media 2226.

Computer readable storage media 2224 is a physical or tangible storage device used to store program code 2218 rather than a medium that propagates or transmits program code 2218. Computer readable storage media 2224 may be, for example, without limitation, an optical or magnetic disk or a persistent storage device that is connected to data processing system 2200.

Alternatively, program code 2218 may be transferred to data processing system 2200 using computer readable signal media 2226. Computer readable signal media 2226 may be, for example, a propagated data signal containing program code 2218. This data signal may be an electromagnetic signal, an optical signal, or some other type of signal that can be transmitted over physical communications links, wireless communications links, or both.

The illustration of data processing system 2200 in FIG. 22 is not meant to provide architectural limitations to the manner in which the illustrative embodiments may be implemented. The different illustrative embodiments may be implemented in a data processing system that includes components in addition to or in place of those illustrated for data processing system 2200. Further, components shown in FIG. 22 may be varied from the illustrative examples shown.

Thus, the illustrative embodiments provide a method and apparatus for using a sensory representation to provide an understanding of the relative significance of items in an entity with respect to one or more measurable factors of interest. In particular, transformed entity sensory representation 104 described in FIG. 1 may allow a user to more quickly and easily understand the relative significance of items, the relative importance of items, or some other relative measure of items without needing to interpret, understand, or process the underlying data.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An entity representation apparatus that comprises:
a processor coupled to a memory;
a transformer in communication with the processor and configured to receive, dynamically in real time, a sensory representation of an entity that comprises a set of measurable factors of interest, such that the sensory representation comprises:
at least one of a sense of: sound, smell, touch, sight, and taste, that represent, dynamically in real-time, a significance of each factor, in the set of measurable factors of interest, relative to other factors in the set of measurable factors of interest of the entity; and
a plurality of sensory representations that represent a plurality of items that are part of the entity, in which each of the plurality of items is associated with a set of values for a set of measurable factors of interest of the entity;
the transformer further configured to continuously calculate in real-time, based on the set of values associated with the each of the plurality of items, a set of scale factors for the each of the plurality of sensory representations; and
the transformer further configured to dynamically modify in real-time the plurality of sensory representations, based on the set of scale factors, to form a plurality of modified sensory representations that dynamically in real-time establish the significance of each factor in the set of measurable factors of interest relative to other factors in the set of measurable factors of interest.

2. The entity representation apparatus of claim 1, wherein the transformer creates a transformed entity sensory representation using the plurality of modified sensory representations.

3. The entity representation apparatus of claim 2 further comprising:
an output device that outputs the transformed entity sensory representation to a relative relationship between the plurality of items represented by the plurality of modified sensory representations with respect to the set of measurable factors of interest.

4. The entity representation apparatus of claim 1, wherein each sensory representation in the plurality of sensory representations is associated with a set of parameters and wherein each of the set of parameters is scalable.

5. The entity representation apparatus of claim 4, wherein the transformer adjusts the set of parameters for the each of the plurality of sensory representations using the set of scale factors corresponding to the each of the plurality of sensory representations to form the plurality of modified sensory representations.

6. The entity representation apparatus of claim 1, further comprising the sensory representation comprising an entity image and the plurality of sensory representations comprising a plurality of image portions and the transformer configured to modify the plurality of image portions using the set of scale factors to create a transformed entity image.

7. The entity representation apparatus of claim 6, further comprising the transformer configured to identify a total display area that: presents the transformed entity image, identifies a plurality of display areas for each of the plurality of image portions, and adjusts the plurality of display areas for the each of the plurality of image portions, based upon the set of scale factors identified for the plurality of image portions to form a plurality of modified display areas.

8. The entity representation apparatus of claim 7, wherein the transformer generates a plurality of modified image portions using the plurality of modified display areas and adjusts a position of the plurality of modified image portions relative to each other within the total display area to form the transformed entity image.

9. The entity representation apparatus of claim 7 further comprising:
a display device that visually presents a display of the transformed entity image, wherein the transformed entity image visually establishes a relative relationship between the plurality of items represented by the plurality of modified sensory representations with respect to the set of measurable factors of interest.

10. The entity representation apparatus of claim 1, further comprising the transformer configured to:
identify a boundary, coordinates of the boundary, and a center point of the coordinates, of dimensions for a total output range for outputting the sensory representation of the entity, such that the total output range comprises different forms, based upon a type of sensation that represents the entity;
identify a plurality of outputs for the plurality of sensory representations the total output range of the sensory representation of the entity;

quantify a set of parameters for each of the plurality of outputs, and a reference center point for each of the plurality of outputs;
compute a distance from each reference center point identified for each of the plurality of outputs to the center point of the total output range;
dependent upon modifications of each of the set of parameters for each of the plurality of outputs, forming a plurality of modified outputs, compute a new reference center point for each of the plurality of modified outputs; and
reconfigure, using the new reference center point for each of the plurality of modified outputs, the plurality of modified outputs, and thereby the plurality of sensory representations, to create a transformed entity sensory representation.

11. The entity representation apparatus of claim 10, further comprising:
the sensory representation comprising an audio representation, such that the boundaries of the total output range correspond to dimensions selected from a group that comprises: time, frequency, sound pressure, and intensity, such that the coordinates for the boundaries comprise: a start time, and end time, a maximum sound pressure level, and minimum sound pressure level; and
a center point for the total output range that comprises: a middle time between a start time and an end time of the audio representation, and a mid-point between a maximum and a minimum sound pressure levels.

12. A computer-implemented method for modifying a sensory representation that represents an entity, the method comprising a transformer:
receiving the sensory representation as at least one of a sense of: sound, smell, touch, sight, and taste, the sensory representation comprising a plurality of sensory representations dynamically representing in real-time a plurality of items that are part of the entity;
associating each of the plurality of items with a set of values for a set of measurable factors of interest of the entity;
dynamically calculating in real time, using the set of values, a set of scale factors for each of the plurality of sensory representations; and
dynamically modifying in real-time, using the set of scale factors and forming a plurality of modified sensory representations establishing continuously in real-time a significance between the plurality of items represented by the plurality of modified sensory representations dynamically indicating in real-time a significance of each factor, in the set of measurable factors of interest, relative to other factors in the set of measurable factors of interest of the entity, the plurality of sensory representations.

13. The computer-implemented method of claim 12, wherein receiving the sensory representation comprises:
receiving the sensory representation comprising the plurality of sensory representations, wherein the each of the plurality of sensory representations is associated with a set of parameters.

14. The computer-implemented method of claim 13 further comprising:
normalizing the set of parameters for the each of the plurality of sensory representations.

15. The computer-implemented method of claim 13, wherein modifying the plurality of sensory representations comprises:

adjusting the set of parameters for the each of the plurality of sensory representations using the set of scale factors corresponding to the each of the plurality of sensory representations to form the plurality of modified sensory representations.

16. The computer-implemented method of claim 12 further comprising:
creating a transformed entity sensory representation using the plurality of modified sensory representations; and
outputting the transformed entity sensory representation to establish a relative relationship between the plurality of items represented by the plurality of modified sensory representations with respect to the set of measurable factors of interest.

17. The computer-implemented method of claim 12, further comprising the transformer:
identifying: a boundary, coordinates of the boundary, and a center point of the coordinates, of dimensions for a total output range for outputting the sensory representation of the entity, such that the total output range comprises different forms, based upon a type of sensation that represents the entity;
identifying a plurality of outputs for the plurality of sensory representations the total output range of the sensory representation of the entity;
quantifying a set of parameters for each of the plurality of outputs, and a reference center point for each of the plurality of outputs;
computing a distance from each reference center point identified for each of the plurality of outputs to the center point of the total output range;
dependent upon modifications of each of the set of parameters for each of the plurality of outputs, forming a plurality of modified outputs, computing a new reference center point for each of the plurality of modified outputs; and
reconfiguring, using the new reference center point for each of the plurality of modified outputs, the plurality of modified outputs, and thereby the plurality of sensory representations creating a transformed entity sensory representation.

18. The computer-implemented method of claim 12, further comprising:
receiving an entity image, wherein the entity image comprises a plurality of image portions; and
modifying the plurality of image portions using the set of scale factors identified for each of the plurality of image portions to create a transformed entity image.

19. The computer-implemented method of claim 18, wherein modifying the plurality of image portions comprises:
identifying a total display area for visually presenting the transformed entity image;
identifying a plurality of display areas for the each of the plurality of image portions with respect to the total display area;
adjusting the plurality of display areas for the each of the plurality of image portions using the set of scale factors identified for the plurality of image portions to form a plurality of modified display areas;
generating a plurality of modified image portions using the plurality of modified display areas; and
adjusting a position of the plurality of modified image portions relative to each other within the total display area to form the transformed entity image.

20. A computer-implemented method for automating a transformation of a sensory representation of an entity into a transformed sensory representation of the entity, the computer-implemented method comprising a transformer:
forming a sensory representation of the entity, the sensory representation being at least one of a sense of: a sound, a smell, a touch, a sight, and a taste;
receiving the sensory representation comprising a plurality of portions that represent a plurality of items forming the entity;
identifying, for each of the plurality of items, a set of values for a set of measurable factors of interest of the entity;
dynamically calculating, in real-time, using the set of values associated with the each of the plurality of items, a set of scale factors for each of the plurality of portions;
forming a plurality of modified portions, comprising sensory representations for each of the plurality of portions, via modifying, using the set of scale factors identified for the each of the plurality of portions; and
dynamically forming, in real-time, the transformed sensory representation of the entity via adjusting, for each of the plurality of modified portions, a center point of a boundary of a dimension for each modified portion relative to each other modified portion with respect to a total output range for the transformed sensory representation of the entity, wherein the transformed sensory representation of the entity dynamically establishes, in real-time, a relative relationship between the plurality of items, of the entity, represented by the plurality of modified portions with respect to the set of measurable factors of interest of the entity.

* * * * *